(12) United States Patent
Kim et al.

(10) Patent No.: US 10,716,148 B2
(45) Date of Patent: Jul. 14, 2020

(54) METHOD AND USER EQUIPMENT FOR TRANSMITTING RANDOM ACCESS PREAMBLE

(71) Applicant: LG Electronics Inc., Seoul (KR)

(72) Inventors: Eunsun Kim, Seoul (KR); Kijun Kim, Seoul (KR); Byounghoon Kim, Seoul (KR); Sukhyon Yoon, Seoul (KR); Hyunsoo Ko, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/065,766

(22) PCT Filed: Mar. 7, 2018

(86) PCT No.: PCT/KR2018/002705
§ 371 (c)(1),
(2) Date: Dec. 19, 2018

(87) PCT Pub. No.: WO2018/164478
PCT Pub. Date: Sep. 13, 2018

(65) Prior Publication Data
US 2019/0394805 A1    Dec. 26, 2019

Related U.S. Application Data

(60) Provisional application No. 62/548,406, filed on Aug. 22, 2017, provisional application No. 62/544,079, (Continued)

(51) Int. Cl.
*H04W 74/08* (2009.01)
*H04W 52/36* (2009.01)
(Continued)

(52) U.S. Cl.
CPC ....... *H04W 74/0833* (2013.01); *H04W 52/36* (2013.01); *H04W 52/42* (2013.01); *H04W 52/50* (2013.01)

(58) Field of Classification Search
CPC . H04W 74/0833; H04W 52/36; H04W 52/42; H04W 52/50
See application file for complete search history.

(56) References Cited

U.S. PATENT DOCUMENTS

2014/0064211 A1    3/2014 Cao et al.
2015/0319719 A1    11/2015 Steudle et al.
(Continued)

FOREIGN PATENT DOCUMENTS

EP           3021621         5/2016
WO      WO2013112646        8/2013

OTHER PUBLICATIONS

Zte et al., "Design of SS Burst Set and SS Block Index", R1-1701573, 3GPP TSG RAN WGl Meeting #88, Athens, Greece, Feb. 7, 2017, See sections 1-2.

(Continued)

*Primary Examiner* — Melvin C Marcelo
(74) *Attorney, Agent, or Firm* — Fish & Richardson P.C.

(57) ABSTRACT

In the present invention, when a UE transmits a random access preamble, the UE maintains a power ramping counter used for determination of a transmission power equally to a value of previous transmission without incrementing the power ramping counter if a target synchronization signal block is changed differently from a previous random access preamble transmission.

18 Claims, 11 Drawing Sheets

Related U.S. Application Data filed on Aug. 11, 2017, provisional application No. 62/524,607, filed on Jun. 25, 2017, provisional application No. 62/521,533, filed on Jun. 19, 2017, provisional application No. 62/516,062, filed on Jun. 6, 2017, provisional application No. 62/511,359, filed on May 26, 2017, provisional application No. 62/468,257, filed on Mar. 7, 2017.

(51) Int. Cl.
*H04W 52/42* (2009.01)
*H04W 52/50* (2009.01)

(56) References Cited

U.S. PATENT DOCUMENTS

| | | | |
|---|---|---|---|
| 2016/0143061 A1 | 5/2016 | Nishio et al. | |
| 2017/0006638 A1 | 1/2017 | Sahlin et al. | |
| 2019/0342925 A1* | 11/2019 | Zhang | H04W 74/0841 |

OTHER PUBLICATIONS

International Search Report and Written Opinion in International Application No. PCT/KR2018/002705, dated Jun. 22, 2018, 18 pages.
Zte et al., "WF on NR Rach Msg. 1 Re-Transmission," R1-1701261, 3GPP TSG RAN WG1 NR Ad Hoc, Spokane, Washington, USA, dated Jan. 16-20, 2017, 3 pages.
Samsung, "4-step random access procedure," R1-1702909, 3GPP TSG RAN WG1 Meeting #88, Athens, Greece, Feb. 13-17, 2017, 10 pages.
NTT Docomo, Inc, "Discussion on 4-step random access procedure for NR," R1-1702831, 3GPP TSG RAN WG1 Meeting #88, Athens Greece, dated Feb. 13-17, 2017, 10 pages.
Sharp, "RACH procedure for multi-Tx beam operation," R1-1703235, 3GPP TSG RAN WG1 Meeting #88, Athens, Greece, Feb. 13-17, 2017, 4 pages.
Mitsubishi Electric, "On RACH retransmission," R1-1700304, 3GPP TSG-RAN WG1 NR adhoc, Spokane, Washington, USA, Jan. 16-20, 2017, 4 pages.
Sony, "Considerations for NR 4-step RACH procedure," R1-1703129, 3GPP TSG RAN WG1 Meeting #88, Athens, Greece, Feb. 13-17, 2017, 4 pages.
3rd Generation Partnership Project; Technical Specification Group Radio Access Network; "Evolved Universal Terrestrial Radio Access (E-UTRA); Medium Access Control (MAC) protocol specification (Release 14)," 3GPP TS 36.321 V14.1.0, dated Dec. 2016, 98 pages, XP55536997.
CATT, "Further details on NR 4-step RA Procedure," R1-1702066, 3GPP TSG RAN WG1 Meeting #88, Athens, Greece, dated Feb. 13-17, 2017, 6 pages, XP051209227.
Extended European Search Report in European Application No. 18763831.7, dated Dec. 20, 2019, 12 pages.
LG Electronics, "Discussion on RACH Procedure," R1-1702442, 3GPP TSG RAN WG1 Meeting #88, Athens, Greece, dated Feb. 13-17, 2017, 4 pages, XP051209596.
Samsung, "NR 4-step random access procedure," R1-1700891, 3GPP TSG RAN WG1 NR Ad Hoc, Spokane, Washington, USA, dated Jan. 16-20, 2017, 14 pages, XP051208407.

* cited by examiner (a)

(b)

METHOD AND USER EQUIPMENT FOR TRANSMITTING RANDOM ACCESS PREAMBLE

CROSS-REFERENCE TO RELATED APPLICATIONS

This application is a National Stage application under 35 U.S.C. § 371 of International Application No. PCT/KR2018/002705, filed on Mar. 7, 2018, which claims the benefit of U.S. Provisional Application No. 62/548,406, filed on Aug. 22, 2017, U.S. Provisional Application No. 62/544,079, filed on Aug. 11, 2017, U.S. Provisional Application No. 62/524,607, filed on Jun. 25, 2017, U.S. Provisional Application No. 62/521,533, filed on Jun. 19, 2017, U.S. Provisional Application No. 62/516,062, filed on Jun. 6, 2017, U.S. Provisional Application No. 62/511,359, filed on May 26, 2017, and U.S. Provisional Application No. 62/468,257, filed on Mar. 7, 2017. The disclosures of the prior applications are incorporated by reference in their entirety.

TECHNICAL FIELD

The present invention relates to a wireless communication system. More particularly, the present invention relates to a method and apparatus for transmitting a random access preamble.

BACKGROUND ART

With appearance and spread of machine-to-machine (M2M) communication and a variety of devices such as smartphones and tablet PCs and technology demanding a large amount of data transmission, data throughput needed in a cellular network has rapidly increased. To satisfy such rapidly increasing data throughput, carrier aggregation technology, cognitive radio technology, etc. for efficiently employing more frequency bands and multiple input multiple output (MIMO) technology, multi-base station (BS) cooperation technology, etc. for raising data capacity transmitted on limited frequency resources have been developed.

A general wireless communication system performs data transmission/reception through one downlink (DL) band and through one uplink (UL) band corresponding to the DL band (in case of a frequency division duplex (FDD) mode), or divides a prescribed radio frame into a UL time unit and a DL time unit in the time domain and then performs data transmission/reception through the UL/DL time unit (in case of a time division duplex (TDD) mode). A base station (BS) and a user equipment (UE) transmit and receive data and/or control information scheduled on a prescribed time unit basis, e.g. on a subframe basis. The data is transmitted and received through a data region configured in a UL/DL subframe and the control information is transmitted and received through a control region configured in the UL/DL subframe. To this end, various physical channels carrying radio signals are formed in the UL/DL subframe. In contrast, carrier aggregation technology serves to use a wider UL/DL bandwidth by aggregating a plurality of UL/DL frequency blocks in order to use a broader frequency band so that more signals relative to signals when a single carrier is used can be simultaneously processed.

In addition, a communication environment has evolved into increasing density of nodes accessible by a user at the periphery of the nodes. A node refers to a fixed point capable of transmitting/receiving a radio signal to/from the UE through one or more antennas. A communication system including high-density nodes may provide a better communication service to the UE through cooperation between the nodes.

As more communication devices have demanded higher communication capacity, there has been necessity of enhanced mobile broadband (eMBB) relative to legacy radio access technology (RAT). In addition, massive machine type communication (mMTC) for providing various services anytime and anywhere by connecting a plurality of devices and objects to each other is one main issue to be considered in future-generation communication.

Further, a communication system to be designed in consideration of services/UEs sensitive to reliability and latency is under discussion. The introduction of future-generation RAT has been discussed by taking into consideration eMBB communication, mMTC, ultra-reliable and low-latency communication (URLLC), and the like.

DISCLOSURE

Technical Problem

Due to introduction of new radio communication technology, the number of user equipments (UEs) to which a BS should provide a service in a prescribed resource region increases and the amount of data and control information that the BS should transmit to the UEs increases. Since the amount of resources available to the BS for communication with the UE(s) is limited, a new method in which the BS efficiently receives/transmits uplink/downlink data and/or uplink/downlink control information using the limited radio resources is needed.

With development of technologies, overcoming delay or latency has become an important challenge. Applications whose performance critically depends on delay/latency are increasing. Accordingly, a method to reduce delay/latency compared to the legacy system is demanded.

Also, with development of smart devices, a new scheme for efficiently transmitting/receiving a small amount of data or efficiently transmitting/receiving data occurring at a low frequency is required.

In addition, a signal transmission/reception method is required in the system supporting new radio access technologies using high frequency bands.

The technical objects that can be achieved through the present invention are not limited to what has been particularly described hereinabove and other technical objects not described herein will be more clearly understood by persons skilled in the art from the following detailed description.

Technical Solution

In one aspect of the present invention, a method for transmitting a random access preamble from a user equipment (UE) in a wireless communication system is provided. The method comprises: performing a first random access preamble transmission for a first synchronization signal (SS) block at a first transmission power; and performing a second random access preamble transmission for a second SS block at a second transmission power if a random access response to the first random access preamble transmission is not received successfully. The second transmission power is determined based on a power ramping counter value used for determination of the first transmission power if the second SS block is different from the first SS block.

In another aspect of the present invention, a UE for transmitting a random access preamble in a wireless communication system is provided. The UE comprises a radio frequency (RF) unit; and a processor configured to control the RF unit. The processor is configured to: perform a first random access preamble transmission for a first synchronization signal (SS) block at a first transmission power, and perform a second random access preamble transmission for a second SS block at a second transmission power if a random access response to the first random access preamble transmission is not received successfully. The processor is configured to determine the second transmission power based on a power ramping counter value used for determination of the first transmission power if the second SS block is different from the first SS block.

In each aspect of the present invention, when the second SS block is equal to the first SS block, the second transmission power may be determined based on a power ramping counter value increased as much as 1 from the power ramping counter value used for determination of the first transmission power if a transmission (Tx) beam used for the second random access preamble transmission is equal to a Tx beam used for the first random access preamble transmission.

In each aspect of the present invention, when the second SS block is equal to the first SS block, the second transmission power may be determined based on a power ramping counter value equal to the power ramping counter value used for determination of the first transmission power if the Tx beam used for the second random access preamble transmission is different from Tx beam used for the first random access preamble transmission.

In each aspect of the present invention, the first random access preamble transmission may be performed using a first random access channel (RACH) resource associated with the first SS block. The second random access preamble transmission may be performed using a second RACH resource associated with the second SS block.

In each aspect of the present invention, the first RACH resource may be different from the second RACH resource if the first SS block is different from the second SS block.

In each aspect of the present invention, a preamble transmission counter for the first random access preamble transmission may be set to a first value by increasing the preamble transmission counter as much as 1. The preamble transmission counter may be set to a second value by adding 1 to the first value for the second random access preamble transmission.

In each aspect of the present invention, the first random access preamble transmission may be performed only if the first value does not exceed the maximum number of preamble transmissions.

In each aspect of the present invention, the second random access preamble transmission may be performed only if the second value does not exceed the maximum number of preamble transmissions.

The above technical solutions are merely some parts of the embodiments of the present invention and various embodiments into which the technical features of the present invention are incorporated can be derived and understood by persons skilled in the art from the following detailed description of the present invention.

Advantageous Effects

According to the present invention, uplink/downlink signals can be efficiently transmitted/received. Therefore, overall throughput of a radio communication system can be improved.

According to an embodiment of the present invention, delay/latency occurring during communication between a user equipment and a base station may be reduced.

In addition, owing to development of smart devices, it is possible to efficiently transmit/receive not only a small amount of data but also data which occurs infrequently.

Moreover, signals can be transmitted/received in the system supporting new radio access technologies.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention, illustrate embodiments of the invention and together with the description serve to explain the principle of the invention.

MODE FOR CARRYING OUT THE INVENTION

Figure 1:
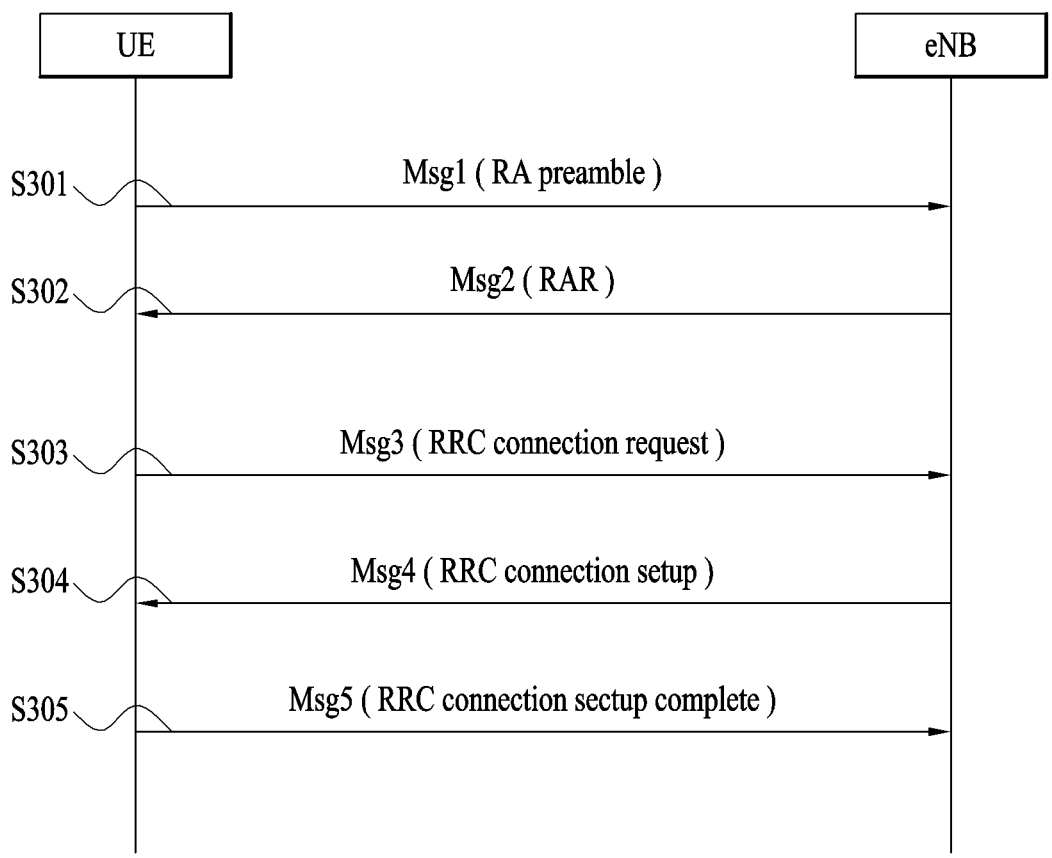
FIG. 1 illustrates a random access procedure in an LTE/LTE-A system.

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the present invention. The same reference numbers will be used throughout this specification to refer to the same or like parts.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE. For convenience of description, it is assumed that the present invention is applied to 3GPP based communication system, e.g. LTE/LTE-A, NR. However, the technical features of the present invention are not limited thereto. For example, although the following detailed description is given based on a mobile communication system corresponding to a 3GPP LTE/LTE-A/NR system, aspects of the present invention that are not specific to 3GPP LTE/LTE-A/NR are applicable to other mobile communication systems.

For example, the present invention is applicable to contention based communication such as Wi-Fi as well as non-contention based communication as in the 3GPP LTE/LTE-A system in which an eNB allocates a DL/UL time/frequency resource to a UE and the UE receives a DL signal and transmits a UL signal according to resource allocation of the eNB. In a non-contention based communication scheme, an access point (AP) or a control node for controlling the AP allocates a resource for communication between the UE and the AP, whereas, in a contention based communication scheme, a communication resource is occupied through contention between UEs which desire to access the AP. The contention based communication scheme will now be described in brief. One type of the contention based communication scheme is carrier sense multiple access (CSMA). CSMA refers to a probabilistic media access control (MAC) protocol for confirming, before a node or a communication device transmits traffic on a shared transmission medium (also called a shared channel) such as a frequency band, that there is no other traffic on the same shared transmission medium. In CSMA, a transmitting device determines whether another transmission is being performed before attempting to transmit traffic to a receiving device. In other words, the transmitting device attempts to detect presence of a carrier from another transmitting device before attempting to perform transmission. Upon sensing the carrier, the transmitting device waits for another transmission device which is performing transmission to finish transmission, before performing transmission thereof. Consequently, CSMA can be a communication scheme based on the principle of "sense before transmit" or "listen before talk". A scheme for avoiding collision between transmitting devices in the contention based communication system using CSMA includes carrier sense multiple access with collision detection (CSMA/CD) and/or carrier sense multiple access with collision avoidance (CSMA/CA). CSMA/CD is a collision detection scheme in a wired local area network (LAN) environment. In CSMA/CD, a personal computer (PC) or a server which desires to perform communication in an Ethernet environment first confirms whether communication occurs on a network and, if another device carries data on the network, the PC or the server waits and then transmits data. That is, when two or more users (e.g. PCs, UEs, etc.) simultaneously transmit data, collision occurs between simultaneous transmission and CSMA/CD is a scheme for flexibly transmitting data by monitoring collision. A transmitting device using CSMA/CD adjusts data transmission thereof by sensing data transmission performed by another device using a specific rule. CSMA/CA is a MAC protocol specified in IEEE 802.11 standards. A wireless LAN (WLAN) system conforming to IEEE 802.11 standards does not use CSMA/CD which has been used in IEEE 802.3 standards and uses CA, i.e. a collision avoidance scheme. Transmission devices always sense carrier of a network and, if the network is empty, the transmission devices wait for determined time according to locations thereof registered in a list and then transmit data. Various methods are used to determine priority of the transmission devices in the list and to reconfigure priority. In a system according to some versions of IEEE 802.11 standards, collision may occur and, in this case, a collision sensing procedure is performed. A transmission device using CSMA/CA avoids collision between data transmission thereof and data transmission of another transmission device using a specific rule.

In embodiments of the present invention described below, the term "assume" may mean that a subject to transmit a channel transmits the channel in accordance with the corresponding "assumption". This may also mean that a subject to receive the channel receives or decodes the channel in a form conforming to the "assumption", on the assumption that the channel has been transmitted according to the "assumption".

In the present invention, puncturing a channel on a specific resource means that the signal of the channel is mapped to the specific resource in the procedure of resource mapping of the channel, but a portion of the signal mapped to the punctured resource is excluded in transmitting the channel. In other words, the specific resource which is punctured is counted as a resource for the channel in the procedure of resource mapping of the channel, a signal mapped to the specific resource among the signals of the channel is not actually transmitted. The receiver of the channel receives, demodulates or decodes the channel, assuming that the signal mapped to the specific resource is not transmitted. On the other hand, rate-matching of a channel on a specific resource means that the channel is never mapped to the specific resource in the procedure of resource mapping of the channel, and thus the specific resource is not used for transmission of the channel. In other words, the rate-matched resource is not counted as a resource for the channel in the procedure of resource mapping of the channel. The receiver of the channel receives, demodulates, or decodes the channel, assuming that the specific rate-matched resource is not used for mapping and transmission of the channel.

In the present invention, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present invention, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. Particularly, a BS of a UTRAN is referred to as a Node-B, a BS of an E-UTRAN is referred to as an eNB, and a BS of a new radio access technology network is referred to as a gNB. In describing the present invention, a BS will be referred to as a gNB.

In the present invention, a node refers to a fixed point capable of transmitting/receiving a radio signal through communication with a UE. Various types of gNBs may be used as nodes irrespective of the terms thereof. For example, a BS, a node B (NB), an e-node B (eNB), a pico-cell eNB (PeNB), a home eNB (HeNB), gNB, a relay, a repeater, etc. may be a node. In addition, the node may not be a gNB. For example, the node may be a radio remote head (RRH) or a radio remote unit (RRU). The RRH or RRU generally has a lower power level than a power level of a gNB. Since the RRH or RRU (hereinafter, RRH/RRU) is generally connected to the gNB through a dedicated line such as an optical cable, cooperative communication between RRH/RRU and the gNB can be smoothly performed in comparison with cooperative communication between gNBs connected by a radio line. At least one antenna is installed per node. The antenna may mean a physical antenna or mean an antenna port or a virtual antenna.

In the present invention, a cell refers to a prescribed geographical area to which one or more nodes provide a communication service. Accordingly, in the present invention, communicating with a specific cell may mean communicating with a gNB or a node which provides a communication service to the specific cell. In addition, a DL/UL signal of a specific cell refers to a DL/UL signal from/to a gNB or a node which provides a communication service to the specific cell. A node providing UL/DL communication services to a UE is called a serving node and a cell to which UL/DL communication services are provided by the serving node is especially called a serving cell. Furthermore, channel status/quality of a specific cell refers to channel status/quality of a channel or communication link formed between a gNB or node which provides a communication service to the specific cell and a UE. In the 3GPP based communication system, the UE may measure DL channel state received from a specific node using cell-specific reference signal(s) (CRS(s)) transmitted on a CRS resource and/or channel state information reference signal(s) (CSI-RS(s)) transmitted on a CSI-RS resource, allocated by antenna port(s) of the specific node to the specific node.

Meanwhile, a 3GPP based communication system uses the concept of a cell in order to manage radio resources and a cell associated with the radio resources is distinguished from a cell of a geographic region.

A "cell" of a geographic region may be understood as coverage within which a node can provide service using a carrier and a "cell" of a radio resource is associated with bandwidth (BW) which is a frequency range configured by the carrier. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of a radio resource used by the node. Accordingly, the term "cell" may be used to indicate service coverage of the node sometimes, a radio resource at other times, or a range that a signal using a radio resource can reach with valid strength at other times.

Meanwhile, the 3GPP communication standards use the concept of a cell to manage radio resources. The "cell" associated with the radio resources is defined by combination of downlink resources and uplink resources, that is, combination of DL CC and UL CC. The cell may be configured by downlink resources only, or may be configured by downlink resources and uplink resources. If carrier aggregation is supported, linkage between a carrier frequency of the downlink resources (or DL CC) and a carrier frequency of the uplink resources (or UL CC) may be indicated by system information. For example, combination of the DL resources and the UL resources may be indicated by linkage of system information block type 2 (SIB2). The carrier frequency means a center frequency of each cell or CC. A cell operating on a primary frequency may be referred to as a primary cell (Pcell) or PCC, and a cell operating on a secondary frequency may be referred to as a secondary cell (Scell) or SCC. The carrier corresponding to the Pcell on downlink will be referred to as a downlink primary CC (DL PCC), and the carrier corresponding to the Pcell on uplink will be referred to as an uplink primary CC (UL PCC). A Scell means a cell that may be configured after completion of radio resource control (RRC) connection establishment and used to provide additional radio resources. The Scell may form a set of serving cells for the UE together with the Pcell in accordance with capabilities of the UE. The carrier corresponding to the Scell on the downlink will be referred to as downlink secondary CC (DL SCC), and the carrier corresponding to the Scell on the uplink will be referred to as uplink secondary CC (UL SCC). Although the UE is in RRC-CONNECTED state, if it is not configured by carrier aggregation or does not support carrier aggregation, a single serving cell configured by the Pcell only exists.

3GPP based communication standards define DL physical channels corresponding to resource elements carrying information derived from a higher layer and DL physical signals corresponding to resource elements which are used by a physical layer but which do not carry information derived from a higher layer. For example, a physical downlink shared channel (PDSCH), a physical broadcast channel (PBCH), a physical multicast channel (PMCH), a physical control format indicator channel (PCFICH), a physical downlink control channel (PDCCH), and a physical hybrid ARQ indicator channel (PHICH) are defined as the DL physical channels, and a reference signal and a synchronization signal are defined as the DL physical signals. A reference signal (RS), also called a pilot, refers to a special waveform of a predefined signal known to both a BS and a UE. For example, a cell-specific RS (CRS), a UE-specific RS (UE-RS), a positioning RS (PRS), and channel state information RS (CSI-RS) may be defined as DL RSs. Meanwhile, the 3GPP LTE/LTE-A standards define UL physical channels corresponding to resource elements carrying information derived from a higher layer and UL physical signals corresponding to resource elements which are used by a physical layer but which do not carry information derived from a higher layer. For example, a physical uplink shared channel (PUSCH), a physical uplink control channel (PUCCH), and a physical random access channel (PRACH) are defined as the UL physical channels, and a demodulation reference signal (DM RS) for a UL control/ data signal and a sounding reference signal (SRS) used for UL channel measurement are defined as the UL physical signals.

In the present invention, a physical downlink control channel (PDCCH), a physical control format indicator channel (PCFICH), a physical hybrid automatic retransmit request indicator channel (PHICH), and a physical downlink shared channel (PDSCH) refer to a set of time-frequency resources or resource elements (REs) carrying downlink control information (DCI), a set of time-frequency resources or REs carrying a control format indicator (CFI), a set of time-frequency resources or REs carrying downlink acknowledgement (ACK)/negative ACK (NACK), and a set of time-frequency resources or REs carrying downlink data, respectively. In addition, a physical uplink control channel (PUCCH), a physical uplink shared channel (PUSCH) and a physical random access channel (PRACH) refer to a set of time-frequency resources or REs carrying uplink control information (UCI), a set of time-frequency resources or REs carrying uplink data and a set of time-frequency resources or REs carrying random access signals, respectively. In the present invention, in particular, a time-frequency resource or RE that is assigned to or belongs to PDCCH/PCFICH/PHICH/PDSCH/PUCCH/PUSCH/PRACH is referred to as PDCCH/PCFICH/PHICH/PDSCH/PUCCH/PUSCH/PRACH RE or PDCCH/PCFICH/PHICH/PDSCH/PUCCH/PUSCH/PRACH time-frequency resource, respectively. Therefore, in the present invention, PUCCH/PUSCH/PRACH transmission of a UE is conceptually identical to UCI/uplink data/random access signal transmission on PUSCH/PUCCH/PRACH, respectively. In addition, PDCCH/PCFICH/PHICH/PDSCH transmission of a gNB is conceptually identical to downlink data/DCI transmission on PDCCH/PCFICH/PHICH/PDSCH, respectively.

Hereinafter, OFDM symbol/subcarrier/RE to or for which CRS/DMRS/CSI-RS/SRS/UE-RS/TRS is assigned or configured will be referred to as CRS/DMRS/CSI-RS/SRS/UE-RS/TRS symbol/carrier/subcarrier/RE. For example, an OFDM symbol to or for which a tracking RS (TRS) is assigned or configured is referred to as a TRS symbol, a subcarrier to or for which the TRS is assigned or configured is referred to as a TRS subcarrier, and an RE to or for which the TRS is assigned or configured is referred to as a TRS RE. In addition, a subframe configured for transmission of the TRS is referred to as a TRS subframe. Moreover, a subframe in which a broadcast signal is transmitted is referred to as a broadcast subframe or a PBCH subframe and a subframe in which a synchronization signal (e.g. PSS and/or SSS) is transmitted is referred to a synchronization signal subframe or a PSS/SSS subframe. OFDM symbol/subcarrier/RE to or for which PSS/SSS is assigned or configured is referred to as PSS/SSS symbol/subcarrier/RE, respectively.

In the present invention, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna ports configured to transmit CRSs may be distinguished from each other by the locations of REs occupied by the CRSs according to CRS ports, antenna ports configured to transmit UE-RSs may be distinguished from each other by the locations of REs occupied by the UE-RSs according to UE-RS ports, and antenna ports configured to transmit CSI-RSs may be distinguished from each other by the locations of REs occupied by the CSI-RSs according to CSI-RS ports. Therefore, the term CRS/UE-RS/CSI-RS/TRS ports may also be used to indicate a pattern of REs occupied by CRSs/UE-RSs/CSI-RSs/TRSs in a predetermined resource region. In the present invention, both a DMRS and a UE-RS refer to RSs for demodulation and, therefore, the terms DMRS and UE-RS are used to refer to RSs for demodulation.

For terms and technologies which are not described in detail in the present invention, reference can be made to the standard document of 3GPP LTE/LTE-A, for example, 3GPP TS 36.211, 3GPP TS 36.212, 3GPP TS 36.213, 3GPP TS 36.321, and 3GPP TS 36.331 and the standard document of 3GPP NR, for example, 3GPP TS 38.211, 3GPP TS 38.212, 3GPP 38.213, 3GPP 38.214, 3GPP 38.215, 3GPP TS 38.321, and 3GPP TS 36.331.

An operation to be first performed by the UE to receive services in association with a specific system includes acquiring time and frequency synchronization of the corresponding system, receiving basic system information (SI), and synchronizing uplink timing to an uplink. This procedure will be referred to as an initial access procedure. The initial access procedure generally includes a synchronization procedure and an RACH procedure (that is, random access procedure). In an LTE/LTE-A system, when a UE is powered on or desires to access a new cell, the UE perform an initial cell search procedure including acquiring time and frequency synchronization with the cell and detecting a physical layer cell identity $N^{cell}_{ID}$ of the cell. To this end, the UE may receive synchronization signals, for example, a primary synchronization signal (PSS) and a secondary synchronization signal (SSS), from an eNB to thus establish synchronization with the eNB and acquire information such as a cell identity (ID). For convenience of description, the synchronization procedure in the LTE/LTE-A system will briefly be described again.

PSS: symbol timing acquisition, frequency synchronization, and cell ID detection within cell ID group (three hypotheses).

SSS: cell ID group detection (168 groups), 10 ms frame boundary detection, CP detection (two types).

PBCH decoding: antenna configuration, 40 ms timing detection, system information, system bandwidth, etc.

That is, the UE acquires OFDM symbol timing and subframe timing based on PSS and SSS and also acquires cell ID, and acquires important information in the corresponding system by descrambling and decoding a PBCH using a cell ID. After completing the synchronization procedure, the UE performs the random access procedure. In other words, after the initial cell search procedure, the UE may perform a random access procedure to complete access to the eNB. To this end, the UE may transmit a preamble through a physical random access channel (PRACH) and receive a response message to the preamble through a PDCCH and a PDSCH. After performing the aforementioned procedures, the UE may perform PDCCH/PDSCH reception and PUSCH/PUCCH transmission as a normal UL/DL transmission procedure. The random access procedure is also referred to as a random access channel (RACH) procedure. The random access procedure is used for various purposes including initial access, adjustment of UL synchronization, resource assignment, and handover.

The random access procedure is classified into a contention-based procedure and a dedicated (that is, non-contention-based) procedure. The contention-based random access procedure is generally used for initial access, and the dedicated random access procedure is restrictively used for handover. In the contention-based random access procedure, the UE randomly selects RACH preamble sequence. Therefore, a plurality of UEs can transmit the same RACH preamble sequence, whereby a contention resolution procedure is required. On the other hand, in the dedicated random access procedure, the UE uses RACH preamble sequence uniquely allocated to a corresponding UE. Therefore, the UE may perform the random access procedure without contention with another UE.

The contention-based random access procedure includes four steps as follows. Hereinafter, messages transmitted in the steps 1 to 4 may be referred to as 1 to 4 (Msg1 to Msg4).

Step 1: RACH preamble (via PRACH)(UE to eNB)
Step 2: random access response (RAR)(via PDCCH PDSCH)(eNB to UE)
Step 3: layer 2/layer 3 message (via PUSCH)(UE to eNB)
Step 4: contention resolution message (eNB to UE)

The dedicated random access procedure includes three steps as follows. Hereinafter, messages transmitted in steps 0 to 2 may be referred to as messages 0 to 2 (Msg0 to Msg2). As a part of the random access procedure, uplink transmission (that is, step 3) corresponding to RAR may be performed. The dedicated random access procedure may be triggered using a PDCCH (hereinafter, PDCCH order) for commanding RACH preamble transmission.

Step 0: RACH preamble allocation (eNB to UE) through dedicated signaling
Step 1: RACH preamble (via PRACH)(UE to eNB)
Step 2: random access response (RAR)(via PDCCH PDSCH 및 eNB to UE)

After transmitting the RACH preamble, the UE attempts to receive a random access response (RAR) within a preset time window. Specifically, the UE attempts to detect a PDCCH with a random access radio network temporary identifier (RA-RNTI) (hereinafter, RA-RNTI PDCCH) (e.g., CRC is masked with RA-RNTI on the PDCCH) in the time window. In detecting the RA-RNTI PDCCH, the UE checks the PDSCH corresponding to the RA-RNTI PDCCH for presence of an RAR directed thereto. The RAR includes timing advance (TA) information indicating timing offset information for UL synchronization, UL resource allocation information (UL grant information), and a temporary UE identifier (e.g., temporary cell-RNTI (TC-RNTI)). The UE may perform UL transmission (of, e.g., Msg3) according to the resource allocation information and the TA value in the RAR. HARQ is applied to UL transmission corresponding to the RAR. Accordingly, after transmitting Msg3, the UE may receive acknowledgement information (e.g., PHICH) corresponding to Msg3.

FIG. 1 illustrates a random access procedure in an LTE/LTE-A system. RRC state is varied depending on RRC connection. The RRC state means whether an entity of RRC layer of a UE is logically connected with an entity of RRC layer of an eNB. The state that the entity of the RRC layer of the UE is connected with the entity of the RRC layer of the eNB means RRC connected state, and the state that the entity of the RRC layer of the UE is not connected with the entity of the RRC layer of the eNB means RRC idle state. The presence of the UE of the idle state is identified in a unit of big zone, and the UE should transition to a connected state to receive a conventional mobile communication service such as voice or data. When a user first turns on a power of the UE, the UE stays in the idle mode in the corresponding cell after searching for a proper cell. The UE stayed in the idle mode establishes an RRC connection with the RRC layer of the eNB through an RRC connection procedure when the RRC connection is required, and transitions to RRC connected state. The RRC connection procedure includes a procedure of transmitting an RRC connection request message from the UE to the eNB, a procedure of transmitting an RRC connection setup message from the eNB to the UE, and a procedure of transmitting an RRC connection setup complete message from the UE to the eNB. Since UL grant is required for transmission of the RRC connection request message, the UE of the idle mode should perform a RACH procedure to acquire UL grant. That is, the UE should transmit an RA preamble (that is, Msg1) (S301) and receive an RAR (that is, Msg2) which is a response to the RA preamble (S302). The UE transmits Msg3, which includes RRC connection request message, to the eNB in accordance with resource allocation information (that is, scheduling information) and a timing advance value within the RAR (S303). If the RRC connection request message is received from the UE, the eNB accepts the RRC connection request of the UE if there are sufficient radio resources, and transmits the RRC connection setup message which is a response message to the UE (S304). If the UE receives the RRC connection setup message, the UE transmits the RRC connection setup complete message to the eNB (S305). If the UE successfully transmits the RRC connection setup message, the UE establishes an RRC connection with the eNB and transitions to the RRC connection mode. That is, if the RACH procedure is completed, the UE becomes the state that it is connected with the corresponding cell.

Figure 2:
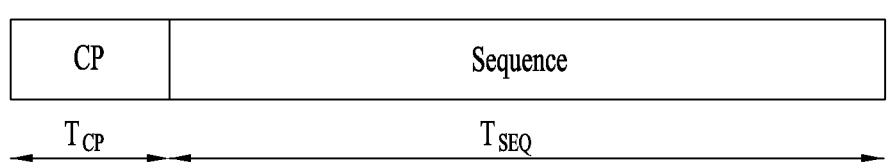
FIG. 2 illustrates a random access preamble format in a legacy LTE/LTE-A system.

FIG. 2 illustrates a random access preamble format in a legacy LTE/LTE-A system.

In the legacy LTE/LTE-A system, a random access preamble, i.e., an RACH preamble, includes a cyclic prefix having a length $T_{CP}$ and a sequence part having a length $T_{SEQ}$ in a physical layer. The parameter values $T_{CP}$ and $T_{SEQ}$ are listed in the following table, and depend on the frame structure and the random access configuration.

TABLE 1

| Preamble format | $T_{CP}$ | $T_{SEQ}$ |
| --- | --- | --- |
| 0 | $3168 \cdot T_s$ | $24576 \cdot T_s$ |
| 1 | $21024 \cdot T_s$ | $24576 \cdot T_s$ |
| 2 | $6240 \cdot T_s$ | $2 \cdot 24576 \cdot T_s$ |
| 3 | $21024 \cdot T_s$ | $2 \cdot 24576 \cdot T_s$ |
| 4 | $448 \cdot T_s$ | $4096 \cdot T_s$ |

In the LTE/LTE-A system, the RACH preamble is transmitted in a UL subframe. The transmission of a random access preamble is restricted to certain time and frequency resources. These resources are called PRACH resources, and enumerated in increasing order of the subframe number within the radio frame and the PRBs in the frequency domain such that index 0 correspond to the lowest numbered PRB and subframe within the radio frame. Random access resources are defined according to the PRACH configuration index (refer to the standard document of 3GPP TS 36.211). The PRACH configuration index is given by a higher layer signal (transmitted by an eNB). In the LTE/LTE-A system, a subcarrier spacing Δf is 15 kHz or 7.5 kHz. However, as given by Table 7, a subcarrier spacing $\Delta f_{RA}$ for a random access preamble is 1.25 kHz or 0.75 kHz.

In case of a physical non-synchronized random access procedure in the LTE/LTE-A system, the L1 random access procedure encompasses a transmission of the random access preamble and a random access response in view of the physical layer. The remaining messages are scheduled for transmission by an upper layer on a common data channel. The random access channel occupies 6 resource blocks within one subframe or a set of consecutive subframes reserved for random access preamble transmission. The eNB is not prohibited to schedule data within the resource blocks reserved for random access response. The following steps are required for layer 1 (L1) random access procedure.

Layer 1 procedure is triggered upon request of preamble transmission by the higher layer.

Preamble index, target preamble received power PREAMBLE_RECEIVED_TARGET_POWER, corresponding RA-RNTI and PRACH resource are indicated by the higher layer as a part of the request.

A preamble transmission power $P_{PRACH}$ is determined as $P_{PRACH}=\min\{P_{CMAX,c}(i)$, PREAMBLE_RECEIVED_TARGET_POWER+$PL_c\}\_[dBm]$. In this case, $P_{CMAX,c}(i)$ is a configured UE transmission power for subframe i of a service cell c, defined in 3GPP TS 36.101, and $PL_c$ is a downlink path loss estimate value calculated for the serving cell c within the UE.

A preamble sequence is selected from a preamble sequence set by using the preamble index.

A single preamble is transmitted using a selected preamble sequence at a transmission power $P_{PRACH}$ on an indicated PRACH resource.

Detection of PDCCH is attempted with the indicated RA-RNTI during a window controlled by the higher layer (see section 5.1.4 of 3GPP TS 36.321). If detected, a corresponding DL-SCH transport block is passed to the higher layer. The higher layer parses the transport block and indicates 20-bit uplink grant to the physical layer.

In case of the LTE/LTE-A system, a random access procedure in a medium access control (MAC) layer is performed as follows:

set PREAMBLE_RECEIVED_TARGET_POWER 'preambleInitialReceivedTargetPower+DELTA_PREAMBLE+(PREAMBLE_TRANSMISSION_COUNTER−1)*powerRampingStep';

if the UE is a bandwidth limited (BL) UE or a UE within enforced coverage:

the UE instructs the physical layer to transmit a preamble with the number of repetitions (that is, numRepetitionPerPreambleAttempt) required for preamble transmission corresponding to a selected preamble group by using a selected PRACH resource corresponding to a selected enhanced coverage level, corresponding RA-RANTI, preamble index, and PREAMBLE_RECEIVED_TARGET_POWER.

else: and the UE instructs the physical layer to transmit the preamble by using a selected PRACH, corresponding RA-RNTI, preamble index and PREAMBLE_RECEIVED_TARGET_POWER.

In the LTE/LTE-A system, information on UL transmission power for RACH preamble transmission is also included in RACH configuration and then delivered to the UE. For example, preambleInitialReceivedTargetPower, powerRampingStep, preambleTransMax, etc. are delivered to the UE by RRC signal as UE common random access parameters (see *PRACH-Config* of 3GPP TS 36.331).

If the UE does not receive Msg2 within a certain time after transmitting RACH Msg1 (that is, RACH preamble), that is, does not receive RAR (that is, Msg2) within RAR window after transmitting RACH Msg1 (that is, RACH preamble), the UE may retransmit RACH Msg1. If the UE retransmits RACH Msg1, the UE may increase a transmission power of the RACH Msg1 to be higher than a power during previous transmission. In the LTE/LTE-A system, the transmission power of the RACH Msg1 is increased as much as a power ramping step by incrementing a layer-2 preamble transmission counter of the UE by 1. PREAMBLE_TRANSMISSION_COUNTER starts from 1 and is incremented by 1 whenever preamble transmission is attempted. If no RAR is received within RAR window, or if all the received RARs do not include random access preamble identifier corresponding to a random access preamble which was transmitted, it is considered that RAR reception is not successful, and the UE increments PREAMBLE_TRANSMISSION_COUNTER as much as 1. Preamble transmission may be performed within the maximum number of preamble transmissions preambleTransMax. For example, if PREAMBLE_TRANSMISSION_COUNTER=preamble TransMax+1, the MAC layer indicates a random access problem to the higher layer, and or considers that the random access procedure is completed unsuccessfully. DELTA_PREAMBLE is a value previously defined in accordance with a preamble format as follows (see Table 7.6-1 of 3GPP TS 36.321).

TABLE 2

| Preamble Format | DELTA_PREAMBLE value |
|---|---|
| 0 | 0 dB |
| 1 | 0 dB |
| 2 | −3 dB |
| 3 | −3 dB |
| 4 | 8 dB |

In Table 2, a preamble format is given by prach-ConfigIndex (see PRACH-Config of 3GPP TS 36.331).

In the current WiFi system, an unlicensed band which is not dedicated for a specific operator is used for communication. On this unlicensed band, if a certain reference, for example, a technology for not causing interference in a radio channel or minimizing interference is adopted, and if a certain output power or less is used, all radio technologies may be used. Therefore, there is the trend toward application of the technology currently used in the cellular network to the unlicensed band. The trend is referred to as licensed assisted access (LAA). Currently, as users who use mobile data are increased explosively as compared with frequencies (that is, licensed band(s)) owned by each radio communication service operator, it is considered to introduce LAA to the LTE system to enhance satisfaction of a user by providing services in the unlicensed band. According to the LAA, a frequency band which is not specified by 3GPP, that is, the unlicensed band may be used for the LTE radio frequency. A WLAN band may be a main application target of LAA. Basically, since radio transmission and reception through contention between communication nodes is assumed in the unlicensed band, channel sensing (CS) is performed before each communication node transmits a signal, whereby it is required to identify that another communication mode does not perform signal transmission in the channel. This is referred to as clear channel assessment (CCA), and the eNB or the UE of the LTE system should perform CCA to transmit a signal in the unlicensed band (hereinafter, referred to as LTE-U band). Also, when the eNB or the UE of the LTE system transmits a signal, other communication nodes such as WiFi should perform CCA so as not to cause interference. For example, in the WiFi standard (e.g., 801.11ac), a CCA threshold value is −62 dBm for a non-WiFi signal and −82 dBm for a WiFi signal. This means that a station (STA) or an access point (AP) does not perform signal transmission so as not to cause interference if a signal other than WiFi is received at a power of −62 dBm or more. Particularly, in the WiFi system, the STA or the AP may perform CCA and signal transmission if a signal of a CCA threshold value or more is not detected for 4 us or more.

Recently, as more communication devices (e.g. MTC devices, IoT devices, and etc.) have demanded higher communication capacity, there has been necessity of enhanced mobile broadband relative to legacy radio access technology (RAT). In addition, massive machine type communication for providing various services irrespective of time and place by connecting a plurality of devices and objects to each other is one main issue to be considered in future-generation communication. Further, a communication system design in which services/UEs sensitive to reliability and latency are considered is under discussion. The introduction of future-generation RAT has been discussed by taking into consideration enhanced mobile broadband communication, massive MTC, ultra-reliable and low-latency communication (URLLC), and the like. In current 3GPP, a study of the future-generation mobile communication system after EPC is being conducted. In the present invention, the corresponding technology is referred to as a new RAT (NR) or 5G RAT, for convenience.

An NR communication system demands that much better performance than a legacy fourth generation (4G) system be supported in terms of data rate, capacity, latency, energy consumption, and cost. Accordingly, the NR system needs to make progress in terms of bandwidth, spectrum, energy, signaling efficiency, and cost per bit.

<OFDM Numerology>

The new RAT system uses an OFDM transmission scheme or a similar transmission scheme. The new RAT system may follow the OFDM parameters different from OFDM parameters of the LTE system. Alternatively, the new RAT system may conform to numerology of the legacy LTE/LTE-A system but may have a broader system bandwidth (e.g., 100 MHz) than the legacy LTE/LTE-A system. One cell may support a plurality of numerologies. That is, UEs that operate with different numerologies may coexist within one cell.

<Slot Structure>

In the 3GPP LTE/LTE-A system, radio frame is 10 ms (307,200 $T_s$) in duration. The radio frame is divided into 10 subframes of equal size. Subframe numbers may be assigned to the 10 subframes within one radio frame, respectively. Here, $T_s$ denotes sampling time where $T_s=1/(2048*15$ kHz$)$. Each subframe is 1 ms long and is further divided into two slots. 20 slots are sequentially numbered from 0 to 19 in one radio frame. Duration of each slot is 0.5 ms. A time interval in which one subframe is transmitted is defined as a transmission time interval (TTI). Time resources may be distinguished by a radio frame number (or radio frame index), a subframe number (or subframe index), a slot number (or slot index), and the like. The TTI refers to an interval during which data can be scheduled. For example, in a current LTE/LTE-A system, a transmission opportunity of a UL grant or a DL grant is present every 1 ms and several transmission opportunities of the UL/DL grant are not present within a shorter time than 1 ms. Therefore, the TTI in the legacy LTE/LTE-A system is 1 ms.

Figure 3:
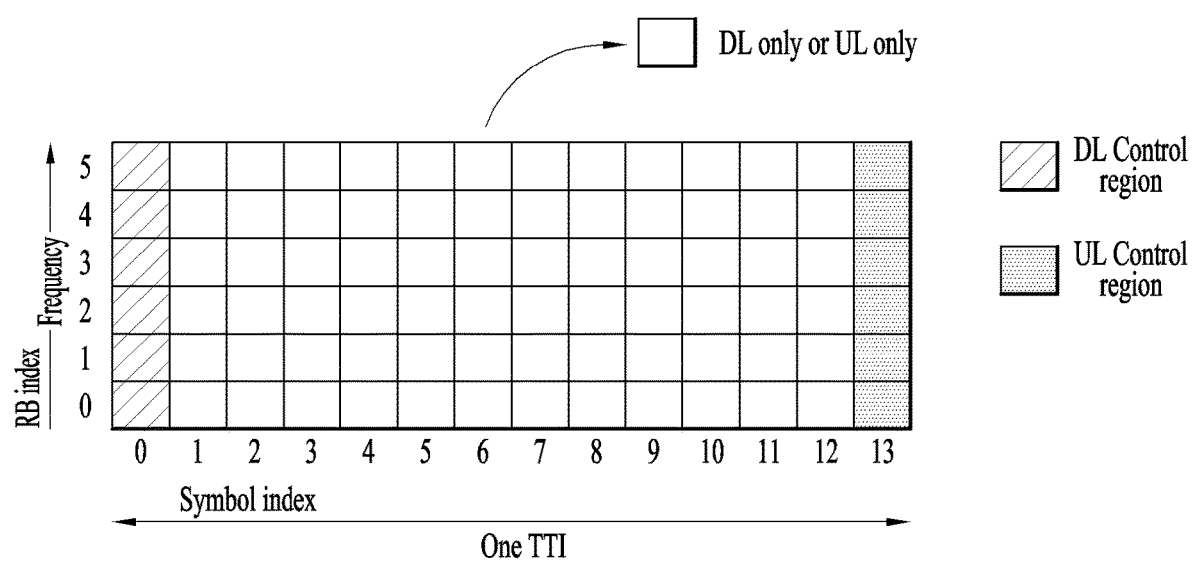
FIG. 3 illustrates a subframe structure available in a new radio access technology (NR).

FIG. 3 illustrates a slot structure available in a new radio access technology (NR).

To minimize data transmission latency, in a 5G new RAT, a slot structure in which a control channel and a data channel are time-division-multiplexed is considered.

In FIG. 3, the hatched area represents the transmission region of a DL control channel (e.g., PDCCH) carrying the DCI, and the black area represents the transmission region of a UL control channel (e.g., PUCCH) carrying the UCI.

Here, the DCI is control information that the gNB transmits to the UE. The DCI may include information on cell configuration that the UE should know, DL specific information such as DL scheduling, and UL specific information such as UL grant. The UCI is control information that the UE transmits to the gNB. The UCI may include a HARQ ACK/NACK report on the DL data, a CSI report on the DL channel status, and a scheduling request (SR).

In FIG. 3, the region of symbols from symbol index 1 to symbol index 12 may be used for transmission of a physical channel (e.g., a PDSCH) carrying downlink data, or may be used for transmission of a physical channel (e.g., PUSCH) carrying uplink data. According to the slot structure of FIG. 3, DL transmission and UL transmission may be sequentially performed in one slot, and thus transmission/reception of DL data and reception/transmission of UL ACK/NACK for the DL data may be performed in one slot. As a result, the time taken to retransmit data when a data transmission error occurs may be reduced, thereby minimizing the latency of final data transmission.

In such a slot structure, a time gap is needed for the process of switching from the transmission mode to the reception mode or from the reception mode to the transmission mode of the gNB and UE. On behalf of the process of switching between the transmission mode and the reception mode, some OFDM symbols at the time of switching from DL to UL in the slot structure are set as a guard period (GP).

In the legacy LTE/LTE-A system, a DL control channel is time-division-multiplexed with a data channel and a PDCCH, which is a control channel, is transmitted throughout an entire system band. However, in the new RAT, it is expected that a bandwidth of one system reaches approximately a minimum of 100 MHz and it is difficult to distribute the control channel throughout the entire band for transmission of the control channel. For data transmission/reception of a UE, if the entire band is monitored to receive the DL control channel, this may cause increase in battery consumption of the UE and deterioration in efficiency. Accordingly, in the present invention, the DL control channel may be locally transmitted or distributively transmitted in a partial frequency band in a system band, i.e., a channel band.

In the NR system, the basic transmission unit is a slot. A duration of the slot includes 14 symbols having a normal cyclic prefix (CP) or 12 symbols having an extended CP. In addition, the slot is scaled in time as a function of a used subcarrier spacing.

In the NR system, a scheduler allocates a radio resource in a unit of TTI. In the NR system, TTI may be one mini-slot, one slot, or a plurality of slots.

<Analog Beamforming>

In the millimeter wave (mmW), the wavelength is shortened, and thus a plurality of antenna elements may be installed in the same area. For example, a total of 100 antenna elements may be installed in a 5-by-5 cm panel in a 30 GHz band with a wavelength of about 1 cm in a 2-dimensional array at intervals of 0.5λ (wavelength). Therefore, in mmW, increasing the coverage or the throughput by increasing the beamforming (BF) gain using multiple antenna elements is taken into consideration.

If a transceiver unit (TXRU) is provided for each antenna element to enable adjustment of transmit power and phase, independent beamforming is possible for each frequency resource. However, installing TXRU in all of the about 100 antenna elements is less feasible in terms of cost. Therefore, considered is a method where multiple antenna elements are mapped to one TXRU and a beam direction is adjusted using an analog phase shifter. This analog beamforming method may only make one beam direction in the whole band, and thus may not perform frequency selective beamforming (BF), which is disadvantageous.

The hybrid BF method can be considered which is an intermediate type of digital BF and analog BF and uses B TXRUs less in number than Q antenna elements. In the case of hybrid BF, the number of directions in which beams may be transmitted at the same time is limited to B or less, which depends on the method of collection of B TXRUs and Q antenna elements.

<Hybrid Analog Beamforming>

Figure 4:
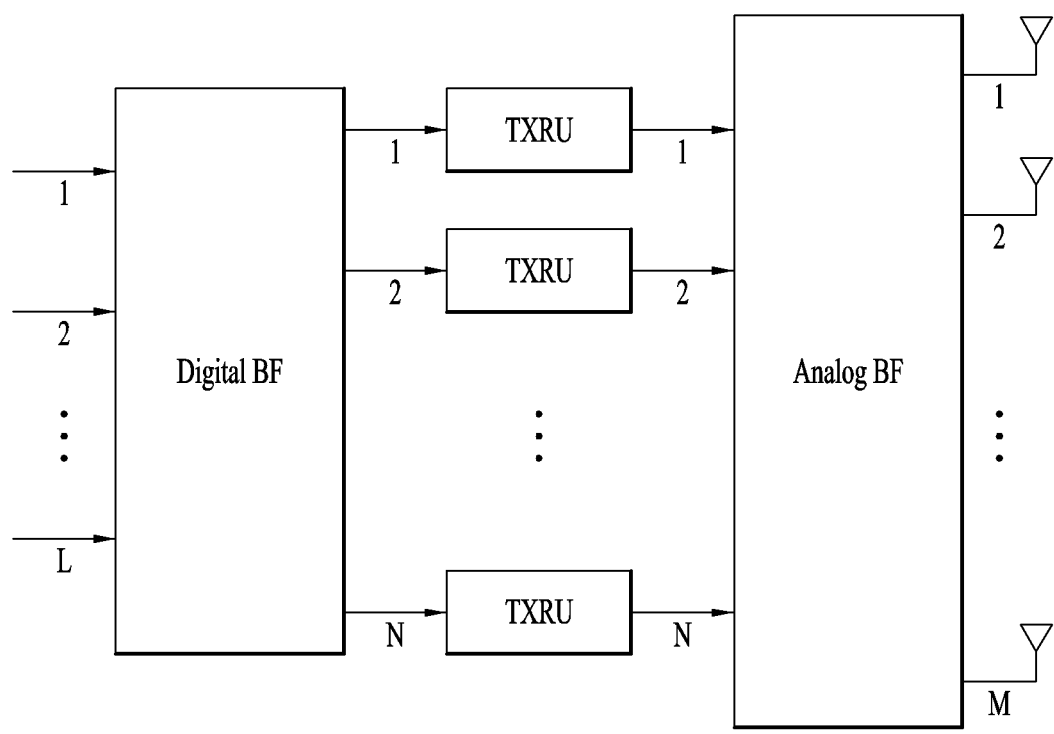
FIG. 4 abstractly illustrates transceiver units (TXRUs) and a hybrid beamforming structure in terms of physical antennas.

FIG. 4 abstractly illustrates TXRUs and a hybrid BF structure in terms of physical antennas.

When a plurality of antennas is used, a hybrid BF method in which digital BF and analog BF are combined is considered. Analog BF (or RF BF) refers to an operation in which an RF unit performs precoding (or combining). In hybrid BF, each of a baseband unit and the RF unit performs precoding (or combining) so that performance approximating to digital BF can be obtained while the number of RF chains and the number of digital-to-analog (D/A) (or analog-to-digital (A/D)) converters is reduced. For convenience, the hybrid BF structure may be expressed as N TXRUs and M physical antennas. Digital BF for L data layers to be transmitted by a transmitter may be expressed as an N-by-L matrix. Next, N converted digital signals are converted into analog signals through the TXRUs and analog BF expressed as an M-by-N matrix is applied to the analog signals. In FIG. 4, the number of digital beams is L and the number of analog beams is N. In the NR system, the BS is designed so as to change analog BF in units of symbols and efficient BF support for a UE located in a specific region is considered. If the N TXRUs and the M RF antennas are defined as one antenna panel, the NR system considers even a method of introducing plural antenna panels to which independent hybrid BF is applicable. In this way, when the BS uses a plurality of analog beams, since which analog beam is favorable for signal reception may differ according to each UE, a beam sweeping operation is considered so that, for at least a synchronization signal, system information, and paging, all UEs may have reception opportunities by changing a plurality of analog beams, that the BS is to apply, according to symbols in a specific slot or subframe.

Recently, a 3GPP standardization organization is considering network slicing to achieve a plurality of logical networks in a single physical network in a new RAT system, i.e., the NR system, which is a 5G wireless communication system. The logical networks should be capable of supporting various services (e.g., eMBB, mMTC, URLLC, etc.) having various requirements. A physical layer system of the NR system considers a method supporting an orthogonal frequency division multiplexing (OFDM) scheme using variable numerologies according to various services. In other words, the NR system may consider the OFDM scheme (or multiple access scheme) using independent numerologies in respective time and frequency resource regions.

Recently, as data traffic remarkably increases with appearance of smartphone devices, the NR system needs to support of higher communication capacity (e.g., data throughput). One method considered to raise the communication capacity is to transmit data using a plurality of transmission (or reception) antennas. If digital BF is desired to be applied to the multiple antennas, each antenna requires an RF chain (e.g., a chain consisting of RF elements such as a power amplifier and a down converter) and a D/A or A/D converter. This structure increases hardware complexity and consumes high power which may not be practical. Accordingly, when multiple antennas are used, the NR system considers the above-mentioned hybrid BF method in which digital BF and analog BF are combined.

Figure 5:
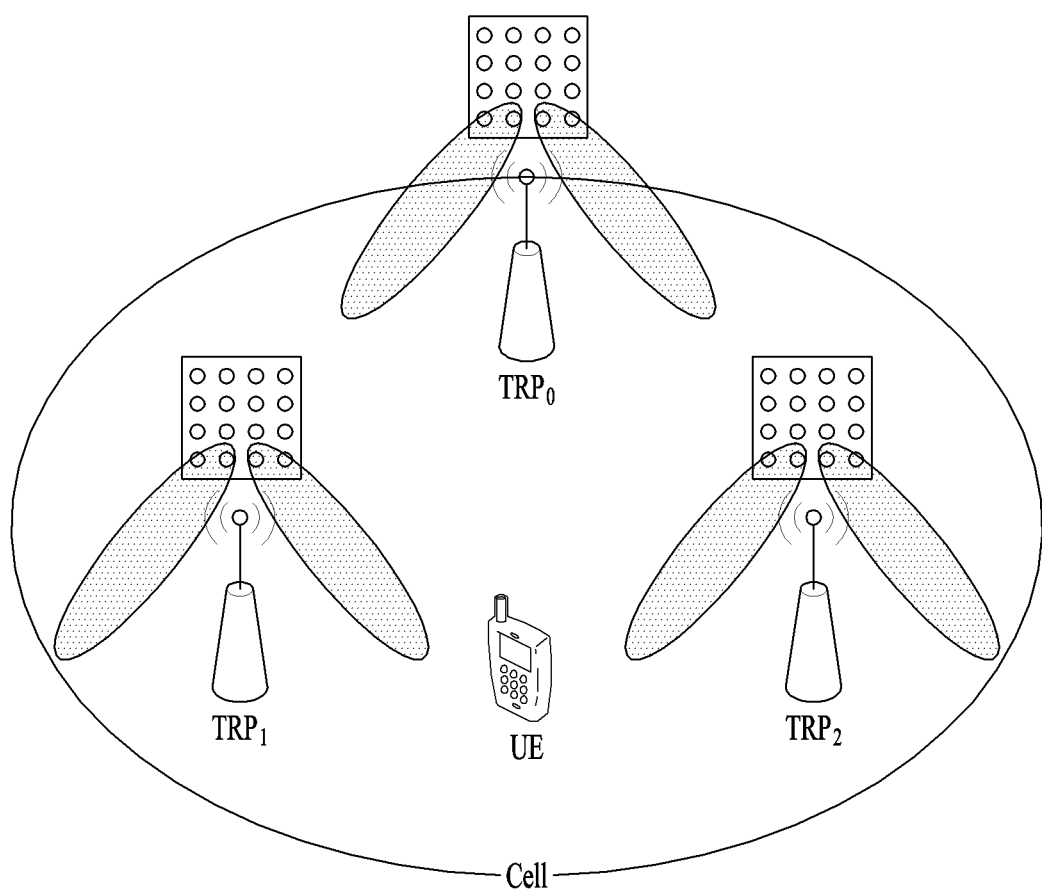
FIG. 5 illustrates a cell of a new radio access technology (NR) system.

FIG. 5 illustrates a cell of a new radio access technology (NR) system.

Referring to FIG. 5, in the NR system, a method in which a plurality of transmission and reception points (TRPs) form one cell is being discussed unlike a wireless communication system of legacy LTE in which one BS forms one cell. If the plural TRPs form one cell, seamless communication can be provided even when a TRP that provides a service to a UE is changed so that mobility management of the UE is facilitated.

In an LTE/LTE-A system, a PSS/SSS is transmitted omni-directionally. Meanwhile, a method is considered in which a gNB which uses millimeter wave (mmWave) transmits a signal such as a PSS/SSS/PBCH through BF while sweeping beam directions omni-directionally. Transmission/reception of a signal while sweeping beam directions is referred to as beam sweeping or beam scanning. In the present invention, "beam sweeping" represents a behavior of a transmitter and "beam scanning" represents a behavior of a receiver. For example, assuming that the gNB may have a maximum of N beam directions, the gNB transmits a signal such as a PSS/SSS/PBCH in each of the N beam directions. That is, the gNB transmits a synchronization signal such as the PSS/SSS/PBCH in each direction while sweeping directions that the gNB can have or the gNB desires to support. Alternatively, when the gNB can form N beams, one beam group may be configured by grouping a few beams and the PSS/SSS/PBCH may be transmitted/received with respect to each beam group. In this case, one beam group includes one or more beams. The signal such as the PSS/SSS/PBCH transmitted in the same direction may be defined as one synchronization (SS) block and a plurality of SS blocks may be present in one cell. When the plural SS blocks are present, SS block indexes may be used to distinguish between the SS blocks. For example, if the PSS/SSS/PBCH is transmitted in 10 beam directions in one system, the PSS/SSS/PBCH transmitted in the same direction may constitute one SS block and it may be understood that 10 SS blocks are present in the system. In the present invention, a beam index may be interpreted as an SS block index.

In a multi-beam environment, whether a UE and/or a TRP can accurately determine a transmission (Tx) or reception (Rx) beam direction between the UE and the TRP is problematic. In the multi-beam environment, signal transmission repetition or beam sweeping for signal reception may be considered according to a Tx/Rx reciprocal capability of the TRP (e.g., eNB) or the UE. The Tx/Rx reciprocal capability is also referred to as Tx/Rx beam correspondence (BC) in the TRP and the UE. In the multi-beam environment, if the Tx/Rx reciprocal capability in the TRP or the UE does not hold, the UE may not transmit a UL signal in a beam direction in which the UE has received a DL signal because an optimal path of UL may be different from an optimal path of DL. Tx/Rx BC in the TRP holds, if the TRP can determine a TRP Rx beam for UL reception based on DL measurement of UE for one or more Tx beams of the TRP and/or if the TRP can determine a TRP Tx beam for DL transmission based on UL measurement for one or more Rx beams of the TRP. Tx/Rx BC in the UE holds if the UE can determine a UE Rx beam for UL transmission based on DL measurement of UE for one or more Rx beams of the UE and/or if the UE can determine a UE Tx beam for DL reception according to indication of the TRP based on UL measurement for one or more Tx beams of the UE.

RACH resources are associated with a DL broadcast signal, and are associated with DL transmission (Tx) beam direction in multi-beam environment. Likewise, in the multi-beam environment, the RACH resources are associated with a specific SS block index. In this case, a RACH resource denotes a time/frequency resource in which a RACH preamble may be transmitted. The RACH resources may be indexed. In the present invention, even though RACH preamble transmission and RACH preamble retransmission are performed in a physical time domain at different PRACH occasions, if RACH preamble transmission and RACH preamble retransmission are performed using RACH resources having the same RACH resource index, the RACH preamble transmission and RACH preamble retransmission may be considered as RACH preamble transmission/retransmission using the same RACH resource. In other words, a RACH resource associated with the same SS block corresponds to a RACH occasion, at which the UE may transmit PRACH, in view of a time domain, wherein the RACH occasion may occur periodically in the time domain.

A method for transmitting RACH Msg1 when Tx/Rx beam correspondence (hereinafter, referred to as BC) of the UE is not hold should be different from a method for transmitting RACH Ms1 when TxRx beam correspondence is hold. Considering this, the present invention suggests a method for controlling a power of RACH Msg1. Particularly, the present invention suggests a method for controlling PRACH transmission power during PRACH retransmission and a random access method considering Tx/Rx BC of UE and TRP in a multi-beam environment of the NR system.

Hereinafter, in a multi-beam environment where a plurality of beams are used between a gNB and a UE, an initial access method, particularly a random access method, which is different from an initial access method of the legacy communication system due to features of analog beamforming, will be described, and the UE and gNB operation according to the present invention and signaling information/method, which should be transmitted between the UE and the gNB will be described.

If BC of the UE and the gNB are hold, a transmission power during RACH preamble retransmission may be determined similarly to the legacy LTE/LTE-A. That is, the UE increases an actual transmission power, that is, target received power, as much as a certain level by increasing a counter for power ramping as much as 1 during every retransmission. However, if BC of the UE is not hold, even though the UE transmits RACH for a specific DL beam received at high quality, since the UE cannot specify a beam direction in uplink exactly, the UE may be required to transmit RACH preamble in a plurality of Tx beam directions that the UE may attempt. Since the UE has no BC capability or is lack of BC capability, the UE transmits a RACH preamble in several beam directions. However, if the UE may transmit a RACH preamble in consecutive RACH (time) resources while sweeping its Tx beam direction, the UE may quickly determine its Tx beam direction. However, in this case, since the network should allocate resources to a corresponding beam direction for a certain time due to features of analog beamforming, network resources may be used inefficiently. Moreover, the UE having BC capability does not need such a resource. Therefore, it is preferable that the UE may transmit a RACH preamble in one specific direction during every RACH preamble transmission. However, in this case, the UE having no BC capability may be required to transmit a RACH preamble several times until its Tx beam is determined. This results in initial access latency of UEs having no BC capability. This initial access latency may be reduced for a certain level by inheriting a transmission power value used for previous transmission without initializing a transmission power if the UE intends to change its Tx beam direction to a direction different from that of previous transmission when retransmitting a RACH preamble during the RACH procedure. The UE may increase the transmission power value by increasing a power ramping counter during retransmission for the same Tx beam. If RACH power is controlled using this method, a transmission counter should be set separately such that the UE may determine whether to end a RACH procedure by calculating the number of RACH preamble retransmissions.

If a UE maintains a power ramping counter value of previous transmission while changing Tx beams, there may be some problems. Hereinafter, these problems will be described with reference to FIG. 6.

Figure 6:
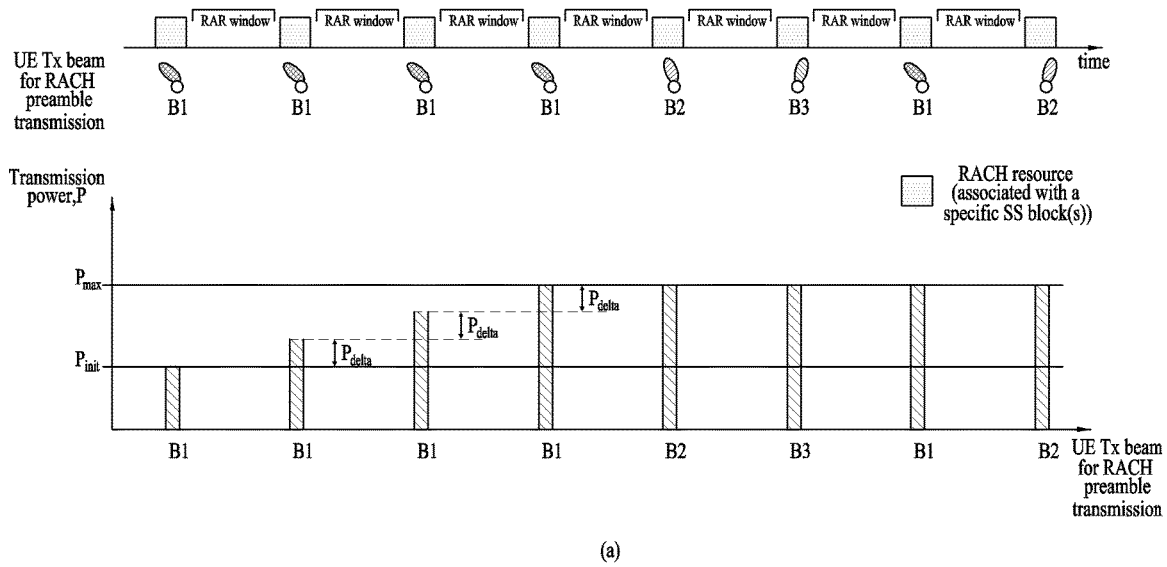
FIG. 6 illustrates problems that may occur when a UE maintains a power ramping counter while changing Tx beams for transmitting RACH preamble.
Figure 6:
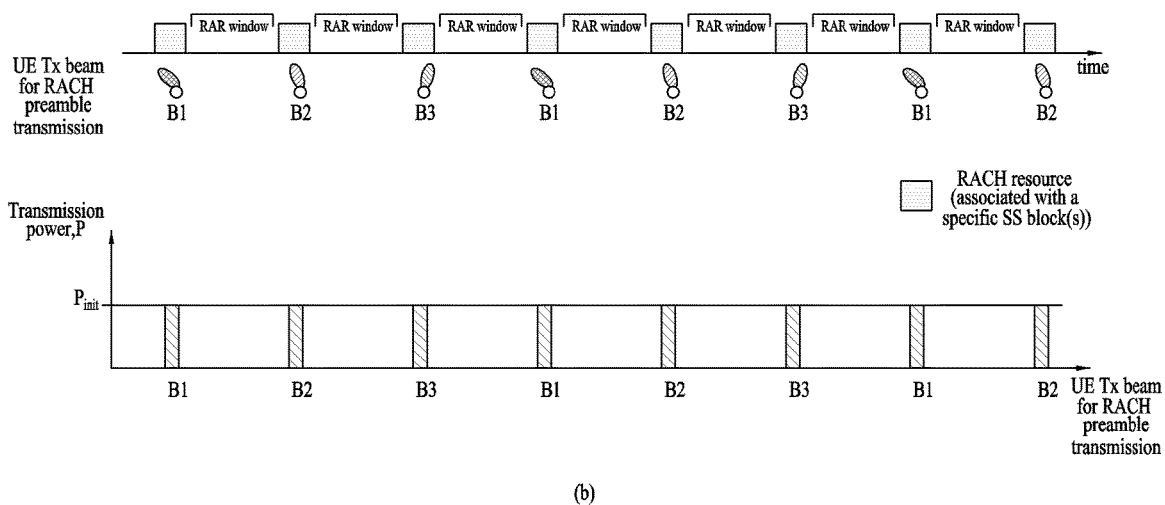

FIG. 6 illustrates problems that may occur when a UE maintains a power ramping counter while changing Tx beams for transmitting RACH preamble(s).

Referring to FIG. 6(a), in case of a UE which maintains a power ramping counter when retransmitting a RACH preamble by changing Tx beams, if the UE continuously changes the Tx beams in a round-robin algorithm, power ramping cannot occur.

Also, referring to FIG. 6(b), the UE may selfishly operate to reserve a contention priority in a contention based random access procedure. That is, the UE may first perform power ramping in a specific beam selected during retransmission and change Tx beam after sufficiently increasing a transmission power, whereby the UE may transmit RACH preamble at a maximum transmission power (or very high target received power), as the case may be, for a Tx beam direction which is not attempted once, during the corresponding RACH procedure. In other words, the UE may perform RACH preamble transmission at a maximum transmission power even though the UE has not transmitted a RACH preamble in all Tx beams within the number of maximum transmissions.

Figure 7:
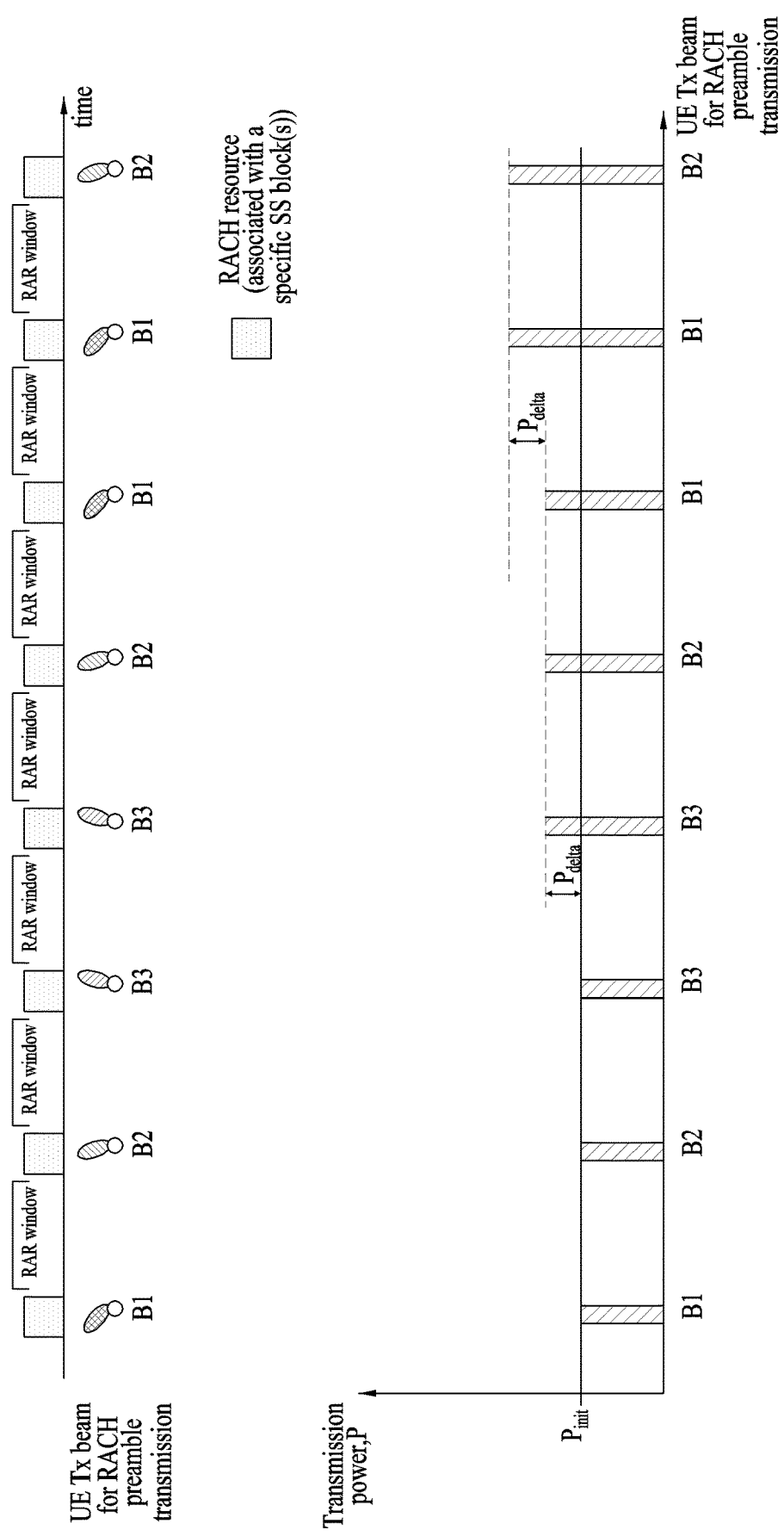
FIG. 7 illustrates a beam switching method for RACH preamble transmission/retransmission.

FIG. 7 illustrates a beam switching method for RACH preamble transmission/retransmission.

To solve problems described in FIG. 7, that is, to control neighboring cell/UE interference with a normal operation of the RACH procedure, a proper UE beam switching rule should be defined. For example, referring to FIG. 7, it is assumed that there are three Tx beams of the UE, that is, the UE may perform transmissions in three beam directions. In this case, a UE beam sweeping rule may be determined such that the UE may first perform beam switching when retransmitting a RACH preamble and then perform power ramping. In this case, as illustrated in FIG. 7, after the UE attempts all of its beams, the UE performs power ramping by using a Tx beam, which has been used last, once again. The UE transmits a RACH preamble with the same Tx beam as a previous Tx beam for power ramping without performing beam switching, only after transmitting RACH preambles for its all beams, that is, only after performing beam switching first. However, since the number of Tx beams that the UE has is different per UE and the network does not know the number of Tx beams in advance, it is not proper that this operation is forced to the UE.

For this reason, constraints for Tx beam change and power ramping of the UE should be given for RACH preamble retransmission, whereby it should be prevented that a random operation of the UE causes unnecessary interference with respect to the system. The present invention suggests a method for efficiently (re)transmitting a RACH preamble by a UE having no BC capability or having partial BC capability while avoiding the random operation of the UE.

Before transmitting a RACH preamble, the UE should determine the number of beam directions for which the UE will attempt the RACH procedure. This is different from that the UE receives a plurality of signals (e.g., SS blocks) transmitted from gNB through DL and determines the number of SS blocks for which the UE will perform the RACH procedure. This relates to how many Tx beams the UE uses when attempting RACH preamble transmission and which direction the UE should attempt the RACH preamble transmission for, when the UE selects one SS block and transmits the RACH preamble for the selected SS block. Before the UE transmits a RACH preamble, a negotiation as to how many Tx beams should be used by the UE to transmit RACH preamble should be made between a higher layer (at least layer 2) and a layer 1 (that is, physical layer) of the UE. In case of a UE having BC capability, one Tx beam direction may be sufficient. In this case, a higher layer of the corresponding UE notifies the layer 1 that the number of Tx beams, which may be used for RACH preamble transmission for SS block, is 1. In case of a UE having no BC capability, a plurality of Tx beam directions should be given, and the higher layer of the UE informs the layer 1 of the number of Tx beams, that is, the number of Tx beam directions. The number of Tx beams, which may be used for RACH preamble transmission for each SS block, may be 2 to dozens.

The Tx beam set should be negotiated between the layer 1 and the layer 2 within the UE, and may be different per UE, and the number of beams within the Tx beam set is related to BC capability of the UE. If the UE determines the best SS block or preferred SS block for the RACH (procedure), the UE needs to determine its Tx beam direction. If the UE does not have BC capability, the UE needs to attempt several Tx beam directions for a target SS block. In the present invention, the Tx beam set means beams with which the UE may attempt a RACH transmission for targeting SS block. The Tx beam set is determined based on the SS block, and if the UE has a complete BC capability, only one Tx beam may exist within the Tx beam set. The number of beams within the Tx beam set may be different depending on a level of BC that the UE has, and if BC performance becomes worse, more beams may be used per SS block.

Therefore, a negotiation within L1 and L2 should be made for the Tx beam set and beam information within the Tx beam set. L2 should give L1 the number of Tx beams and beam direction information (e.g., weight vector, spatial parameters, etc.) for the selected RACH resource.

A method for constraining a transmission power according to beam switching suggested in the present invention is not applied to a UE of which BC is hold (e.g., the number of beams is 1), and is applied to only a case of a UE of which BC is not hold. Alternatively, application of the present invention may be determined depending on the number of Tx beams in the network. For example, if the number of beams within the Tx beam set is $N_{tx}$ or less, constraints of a transmission power according to beam direction change suggested in the present invention may not be applied, and the constraints may be applied only if the number of beams within the Tx beam set exceeds $N_{tx}$. $N_{tx}$ may be configured by the network and signaled to the UE. Hereinafter, the suggestions of the present invention, which are used to control or determine RACH preamble transmission power, will be described in detail.

Suggestion 1) Constraint of Transmission Power Per Tx Beam

PRACH transmission/retransmission procedure may be described as follows.

A transmission power for transmitting RACH preamble in a physical layer of the UE is determined by the following Equation.

$$P_{PRACH} = \min\{P_{CMAX,c}(i), \text{PREAMBLE\_RECEIVED\_TARGET\_POWER} + PL_c\}\_[\text{dBm}]. \quad \text{Equation (1):}$$

In Equation (1), $P_{CMAX,c}(i)$ is the configured UE transmit power for slot i of serving c and $PL_c$ is downlink path loss estimate calculated in the UE for serving c.

In Equation (1), PREAMBLE_RECEIVED_TARGET_POWER is a value indicated by a higher layer (e.g. layer 2), the value of PREAMBLE_RECEIVED_TARGET_POWER in the higher layer is determined by setting PREAMBLE_RECEIVED_TARGET_POWER to the following equation.

$$\text{preambleInitialReceivedTargetPower} + \text{DELTA\_PREAMBLE} + (\text{POWER\_RAMPING\_COUNTER} - 1) * \text{powerRampingStep}. \quad \text{Equation (2):}$$

In the Equation (2), values of preambleInitialReceivedTargetPower, DELTA_PREAMBLE, and powerRampingStep are configured to the UE by network signaling in advance. If the UE initiates a RACH procedure, POWER_RAMPING_COUNTER is initialized to a specific value, for example, POWER_RAMPING_COUNTER=1. To calculate the number of preamble transmissions at the UE, PREAMBLE_TRANSMISSION_COUNTER may be configured separately, and PREAMBLE_TRANSMISSION_COUNTER is also initialized to a certain value, for example, 1. If the UE determines that it has not received RAR successfully after transmitting a RACH preamble, the physical layer delivers information indicating that RAR has not been received successfully, to the higher layer. If this information is received, the higher layer may instruct the physical layer to attempt RACH retransmission. In other words, the UE which has not received RAR successfully after transmitting a RACH preamble may attempt PRACH retransmission. If RAR is not received successfully, first the UE increases PREAMBLE_TRANSMISSION_COUNTER as much as 1, and identifies whether the corresponding RACH preamble transmission is within the configured maximum number of retransmissions. If RAR is not received successfully even after the UE has attempted the RACH preamble transmission up to the maximum number of retransmissions, the UE ends the RACH procedure and reports to the higher layer that the RACH procedure has been failed. In other words, if RAR is not received within RAR window, the UE or layer 2 of the UE:

increment PREAMBLE_TRANSMISSION_COUNTER by 1;
 If PREAMBLE_TRANSMISSION_COUNTER= preambleTransMax+1:
  indicate a random access problem to upper layers.

However, if the number of RACH preamble transmissions up to the previous transmission is smaller than the maximum number of retransmission allowable (e.g., preambleTransMax), the UE may attempt retransmission of RACH preamble, and first determines whether to change or maintain a Tx beam direction for retransmission of the RACH preamble. As described above, in order that the UE first attempts power ramping by using a specific beam to prevent excessive interference from being caused, the UE which may perform Tx beam switching may be constrained so as not to use one beam consecutively M times or more. In this case, if the UE intends to transmit a PRACH by selecting a beam direction different from a beam direction used for the previous PRACH transmission, the UE may select a beam without separate constraint. However, if the UE intends to transmit PRACH by selecting a beam direction which is the same as a beam direction used for previous PRACH transmission, the UE may calculate the number of consecutive PRACH transmissions with the corresponding beam. As a result, if the number of consecutive PRACH transmissions is equal to M, the UE should transmit a PRACH with another beam. If the UE transmits a PRACH in a specific beam direction by exceeding M times, the UE uses another beam direction other than the corresponding beam during later PRACH retransmission. In other words, if RAR is not received within RAR window, the UE or layer 2 of the UE:

increments consecutive_transmission_counter [k] by 1, where k is a Tx beam index of the UE, which is previously used for RACH preamble transmission.

If beam index selected for next RACH preamble=n,
  if n=k,
    if consecutive_transmission_counter [k]=M, a beam index n(≠k) is reselected;
    else, increments POWER_RAMPING_COUNTER by 1,
  else, maintains POWER_RAMPING_COUNTER.

If the selected beam index 'n' is different from 'k', a value for a previous transmission is inherited as a value of POWER_RAMPING_COUNTER, and if the selected beam index 'n' is equal to the beam index 'k' used for previous transmission, POWER_RAMPING_COUNTER is incremented by 1.

Afterwards, although PRACH transmission power of the UE may be determined as expressed in the Equation (1), additional constraints may be defined in determining a transmission power. For example, let's assume that the UE attempts power ramping of several times by transmitting a RACH preamble in a beam direction and thus PREAMBLE_RECEIVED_TARGET_POWER of the UE is set to a relatively high value. However, if the UE transmits a RACH preamble at PREAMBLE_RECEIVED_TARGET_POWER which is relatively high with respect to a beam direction, which has not been attempted until now, during RACH preamble retransmission, the PRACH transmission may cause high inter-cell interference and/or high intra-cell interference. Therefore, to solve this problem, the present invention suggests the following methods.

1) Method A: suggests that the UE should store the most recent transmission power history per Tx. When the UE intends to change a Tx beam direction in a state that the power ramping counter of the UE is increased at some level, a transmission power value in a corresponding beam direction may be defined based on the history so as not to be increased at some level (e.g., X dB) or more compared with the most recent transmission power at which the has transmitted a RACH preamble with the corresponding beam. For example, PRACH transmission power $P_{PRACH}$ may be determined as expressed by the following Equation: $P_{PRACH}=\min\{P_{CMAX,c}(i), \text{PREAMBLE\_RECEIVED\_TARGET\_POWER+PL}, P_{PRACH,j}[k]+X\}\_[dBm]$, where $P_{PRACH,j}[k]$ is a transmission power of a RACH preamble using a Tx beam index k in the j-th slot, and j indicates a previous timing prior to a timing point for determining $P_{PRACH}$. An exact value for X may previously be signaled to the UE by the network.

2) Method B: is a modified method of the method A, and may be defined such that a certain constraint according to the present invention is applied during transmission power determination only if a specific condition is satisfied. For example, transmission power determination of the UE based on the aforementioned Equation and procedure may be applied together with the following additional conditions and constraints.

Conditions
  Condition i. PREAMBLE_RECEIVED_TARGET_POWER+PL ≥$P_{CMAX,c}(i)$. That is, if PREAMBLE_RECEIVED_TARGET_POWER+PL value calculated by the higher layer exceeds an uplink maximum transmission power $P_{CMAX,c}(i)$,
  Condition ii. If the transmission power value indicated by the higher layer in accordance with RACH preamble retransmission and power ramping exceeds a power level $P_{set}$ configured by gNB (that is, PREAMBLE_RECEIVED_TARGET_POWER+PL ≥$P_{set}$, wherein $P_{set}$ is configured by the network),
  Condition iii. If PREAMBLE_RECEIVED_TARGET_POWER value calculated based on RACH preamble retransmission and beam selection exceeds a value configured by the network (that is, PREAMBLE_RECEIVED_TARGET_POWER ≥ $P_{max\_preamble\_received\_target}$, wherein $P_{max\_preamble\_received\_target}$ is configured by the network), and/or
  Condition iv. A maximum value of the power ramping counter may be configured by the network. The power ramping counter is calculated in accordance with a beam selected for PRACH retransmission by the UE, and this condition correspond to a case that the power ramping counter value calculated by the UE exceeds the power ramping counter maximum value $M_{max}$.

The network may select and signal one or combination of the conditions i to iv as a condition for determining whether to apply additional constraint when a transmission power of the UE is determined. If this condition is satisfied, the UE may be constrained to reduce a transmission power during PRACH retransmission. If this condition is satisfied, the UE may reset the transmission power or determine a retransmission power as a value indicated by the gNB. The additional constraint will be described as follows.

Constraint (Additional Operation)

Figure 8:
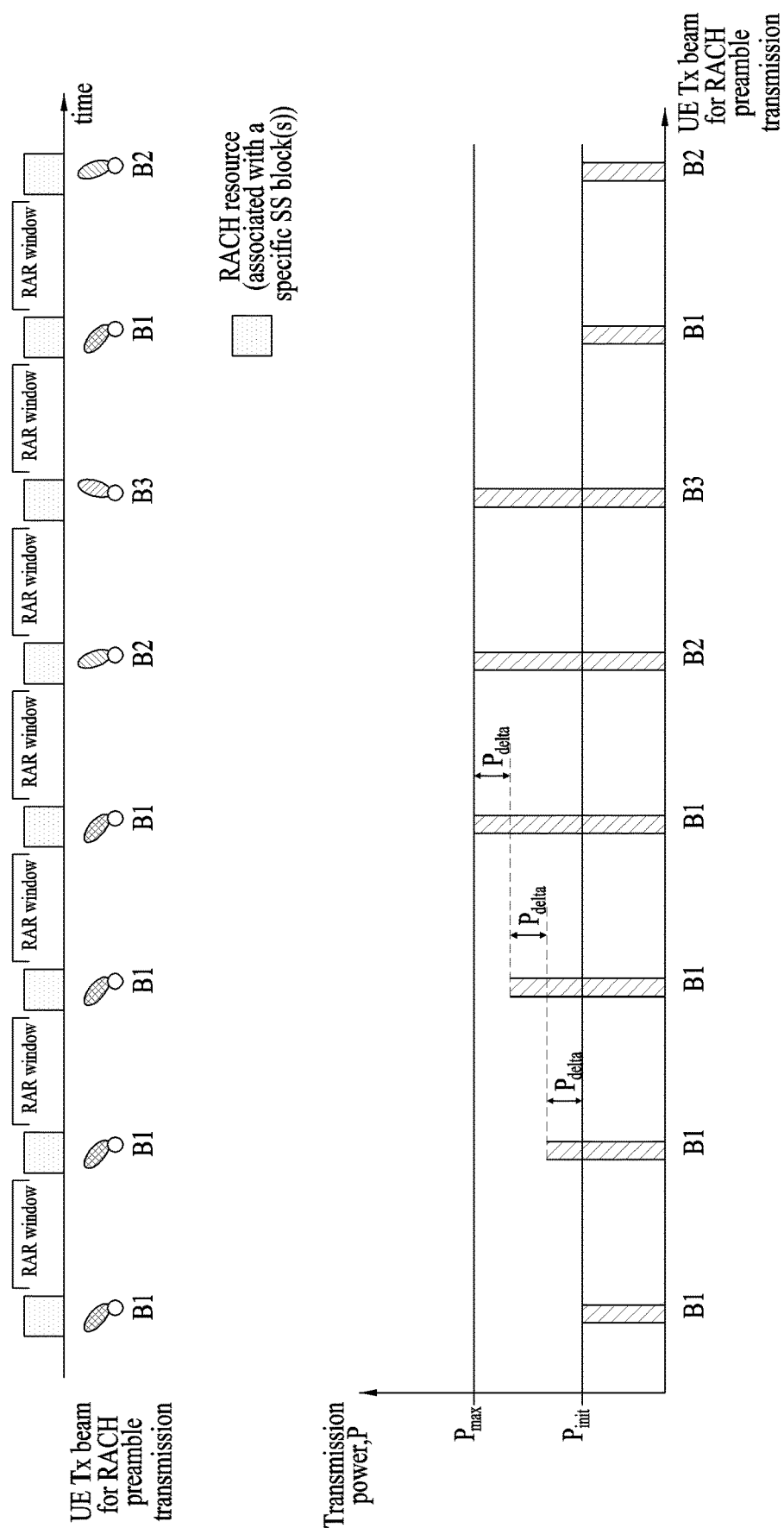
FIGS. 8 and 9 illustrate PRACH transmission/retransmission and corresponding PRACH transmission power according to the present invention.
Figure 9:
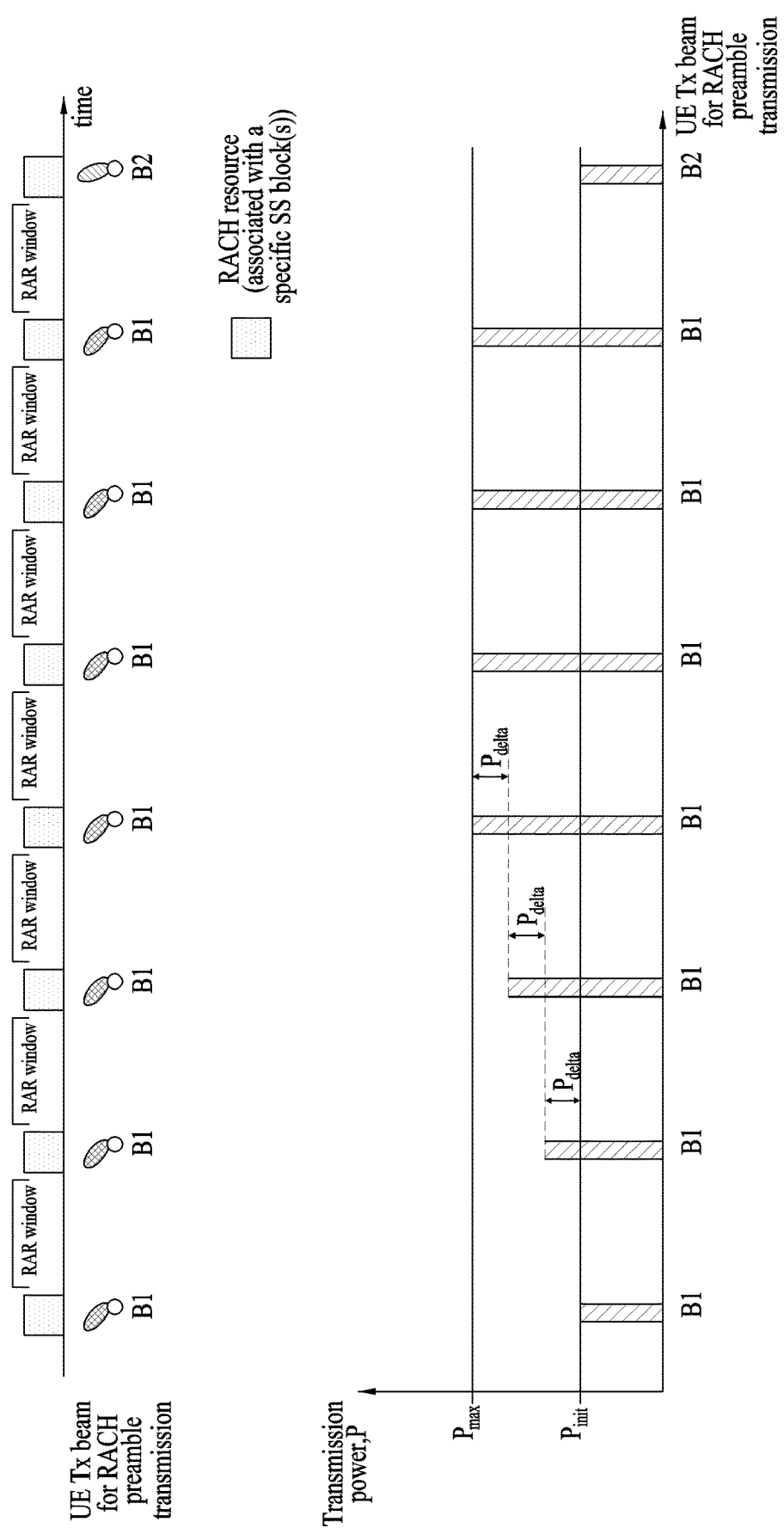

FIGS. 8 and 9 illustrate PRACH transmission/retransmission and corresponding PRACH transmission power according to the present invention.

The present invention suggests that the UE should transmit RACH preamble at a corresponding power (e.g., maximum transmission power) as much as a certain number of times and then reset PRACH transmission power to an initial value $P_{init}$ (or a specific transmission power designated by the network) if the condition i, the condition ii, and the condition iii and/or the condition iv are satisfied, for example, referring to FIGS. 8 and 9, if the UE selects and transmits a RACH preamble after the condition i is satisfied, that is, the transmission power calculated by the UE reaches (or exceeds) a maximum transmission power. In this case, the number of times that the UE may transmit RACH preamble(s) at a maximum transmission power $P_{max}$ may be equal to the number of Tx beams of the UE, for example. The UE may freely select its Tx beam for the number of times that the UE is allowed to transmit RACH preamble(s) at a maximum transmission power, before resetting the transmission power. Afterwards, the UE performs power ramping in accordance with the number of RACH preamble retransmission and a beam direction, starting from the reset value.

The condition ii is a modified condition of the condition i, and if the PRACH transmission power calculated by the UE reaches (or exceeds) a specific transmission power value $P_{set}$ configured by the network and the UE transmits a RACH preamble by selecting different Tx beams, the UE transmits PRACH (that is, RACH preamble) at the corresponding power $P_{set}$ as much as the certain number of times and then resets the PRACH transmission power to an initial value or a value configured by the network during PRACH retransmission. The number of times that the UE is allowed to transmit RACH preamble at a transmission power $P_{set}$ may be restricted, and the maximum number of times that the UE is allowed to transmit RACH preamble at a transmission power $P_{set}$ may be equal to the number of beams of the UE or may be configured by the network. That is, the UE may perform RACH preamble retransmission by selecting different Tx beams as much as the configured number of times. Afterwards, the UE performs power ramping in accordance with RACH preamble retransmission times and beam direction, starting from the reset value.

For the condition iii, the condition is configured such that PREAMBLE_RECEIVED_TARGET_POWER reaches (or exceeds) a specific value to facilitate the operation in L2, since the PRACH transmission power is determined in layer 1 (that is, L1) and beam selection and ramping/transmission counter are determined in layer 2 (that is, L2). If PREAMBLE_RECEIVED_TARGET_POWER reaches (or exceeds) a specific value, later operation is similar to the aforementioned operation. That is, in case of PREAMBLE_RECEIVED_TARGET_POWER $\geq P_{max\_preamble\_received\_target}$, PREAMBLE_RECEIVED_TARGET_POWER=$P_{max\_preamble\_received\_target\_i}$ is set, whereby PRACH transmission power is determined. For example, the PRACH transmission power $P_{PRACH}$ is determined as $P_{PRACH}=\min\{P_{CMAX,c}(i), P_{max\_preamble\_received\_target}+PL\}$ [dBm]. If the UE intends to transmit PRACH by changing Tx beam, the UE may transmit RACH preamble at the corresponding transmission power up to L times. In other words, the UE may transmit PRACH at the corresponding transmission power by using (maximum) L Tx beams. After the number of PRACH transmission exceeds L times, the PRACH transmission power is determined by a specific value configured by the network. L may be equal to the number of Tx beams of the UE or may be signaled to the UE by the network. Afterwards, if the UE attempts retransmission of RACH preamble, PREAMBLE_RECEIVED_TARGET_POWER of the UE may be reset to an initial value or a value configured by the network.

Referring to FIG. 9, if the transmission power is constrained by the condition i, the condition ii, or the condition iii, the UE may retransmit RACH preamble as much as the allowed number of times at $P_{CMAX,c}(i)$ or the power value configured by the network, and then may reset the transmission power to the initialized value $P_{init}$ to perform power ramping. Alternatively, the retransmission power may be designated to a value indicated by the eNB not the initial value.

If the transmission power is constrained by the condition iv and the condition iv is satisfied, the power ramping counter of the UE may be defined so as not to be increased any more. Alternatively, if the corresponding condition is satisfied, the power ramping counter of the UE may be reset to the initial value (e.g., 1) or a specific value configured by the network during later PRACH retransmission.

In respect of the aforementioned operation(s), the gNB may configure a plurality of different conditions. For example, the gNB may configure a plurality of power levels, and the number of times that a UE is allowed to transmit RACH preamble may be designated differently per corresponding power level for a case that RACH preamble transmission power (or calculated PREAMBLE_RECEIVED_TARGET_POWER value) reaches each power level. For example, it is assumed that power levels P1 and P2(P1<P2) are designated, and the number of times that a UE is allowed to transmit RACH preamble at P1 when the transmission power reaches P1 is designated as N1 times and the number of times that a UE is allowed to transmit RACH preamble at P2 when the transmission power reaches P2 is designated as N2 times. In this case, if the RACH preamble transmission power (or calculated PREAMBLE_RECEIVED_TARGET_POWER value) reaches P1, the UE may retransmit RACH preamble at the transmission power P1 maximum N1 times. Retransmission of the RACH preamble at the same transmission power P1 N1 times in spite of increase of the retransmission times means that the UE may transmit RACH preamble maximum N1 times while changing Tx beams. That is, this means that the number of Tx beams through which the UE may attempt RACH preamble transmission at the transmission power P1 is limited to N1. If the RACH procedure is not performed successfully and thus additional retransmission is performed even after RACH retransmission is performed as much as N1 times, power ramping should be performed for the PRACH transmission power during (N1+1)-th retransmission. The UE may perform retransmission of maximum N1 times at a newly updated power. If the transmission power (or PREAMBLE_RECEIVED_TARGET_POWER) reaches P1, the number of Tx beams through which the UE may transmit RACH preamble is limited to N1 per power level greater than P1. Power ramping during later PRACH retransmission depends on a general RACH power control except constraint that the number of Tx beams is N1. That is, although a transmission power is ramping up every PRACH retransmission, the power ramping counter is maintained as it is when the Tx beam is changed. In this way, although the UE has performed PRACH retransmission and power ramping, if the transmission power (or calculated PREAMBLE_RECEIVED_TARGET_POWER) reaches P2, the UE may retransmit RACH preamble at a power of P2 (or calculated PREAMBLE_RECEIVED_TARGET_POWER) until N2 times. That is, RACH preamble may be transmitted in N2 Tx beams only. PREAMBLE_RECEIVED_TARGET_POWER will be described as an example:

If PREAMBLE_RECEIVED_TARGET_POWER <P1, power ramping for PRACH transmission power is performed without separate constraint during PRACH retransmission.

If P1≤PREAMBLE_RECEIVED_TARGET_POWER <P2, the number of beams that may be used by the UE during RACH preamble transmission is limited to N1. That is, the number of times that the UE may transmit RACH preamble at the same power is limited to N1. The number of times that the UE may transmit RACH preamble in a state that the UE does not change the power ramping counter is limited to N1.

If P2≤PREAMBLE_RECEIVED_TARGET_POWER, the number of beams that may be used by the UE during RACH preamble transmission is limited to N2. That is, the number of times that the UE may transmit RACH preamble at the same power is limited to N1.

The number of times that the UE may transmit RACH preamble in a state that the UE does not change the power ramping counter is limited to N2.

In case of the condition iv, a plurality of values are configured, and the power ramping counter may be reset whenever the power ramping counter reaches a value among the plurality of values. Alternatively, a plurality of values are configured (to the UE by the network) with respect to the power ramping counter, and the number of times that the UE may transmit RACH preamble in a state that the corresponding power ramping counter is maintained may be designated (by the network) whenever each condition is satisfied. For example, it is assumed that RACH preamble may be transmitted N1 times when the power ramping counter reaches PC1 and may be transmitted N2 times when the power ramping counter reaches PC2. PC1, PC2, N1 and N2 are values configured to the UE by the network. In this case:

If the power ramping counter <PC1, a separate constraint is not given to power ramping or beam switching during PRACH retransmission. A general power control rule is applied.

If PC1≤power ramping counter <PC2, the number of beams that may be attempted by the UE during RACH preamble retransmission is limited to N1.

If PC1≤power ramping counter (≤$M_{max}$), the number of beams that may be attempted by the UE during RACH preamble retransmission is limited to N2.

The condition(s) and constraint by the corresponding condition(s) are applied if the UE changes Tx beams during later RACH preamble retransmission. This constraint is not limited if the UE does not change Tx beams. That is, even though the RACH preamble transmission power of the UE reaches a specific power level, if the UE does not change Tx beams during later RACH preamble transmission, the UE may perform power ramping continuously, and has no reason to transmit RACH preamble by reducing (or maintaining) the transmission power.

Whether to apply the condition(s) and the constraint by the corresponding condition(s) is determined by whether there is capability that can determine correspondence to Tx/Rx beam direction of the UE. Before transmitting RACH preamble, the UE should determine how many beam directions exist for which the UE attempts PRACH. This is different from that the UE receives a plurality of signals (e.g., SS blocks) transmitted from the gNB through a DL and determines the number of SS blocks that the UE will perform the RACH procedure, and relates to how many Tx beams the UE uses when attempting RACH preamble transmission and which direction the UE should attempt the RACH preamble transmission, when selecting one SS block and transmitting RACH preamble for the selected SS block. Before the UE transmits RACH preamble, a negotiation as to how many Tx beams should be used by the UE to transmit RACH preamble should be made between a higher layer (at least layer 2) and a layer 1 of the UE. In case of a UE having BC capability, one Tx beam direction may be sufficient. In this case, a higher layer of the corresponding UE notifies the layer 1 that the number of Tx beams is 1. In case of a UE having no BC capability, a plurality of Tx beam directions should be given, and the higher layer of the UE notifies the layer 1 of the number of Tx beams, that is, the number of Tx beam directions. The number of Tx beams, which may be used for RACH preamble transmission for each SS block, may be 2 to dozens.

The method for constraining a transmission power according to beam switching that the present invention suggests is not applied to a UE of which BC is hold (e.g., the number of Tx beams is 1), and is applied to only a case of a UE of which BC is not hold. Alternatively, whether to apply the present invention may be determined by the network depending on the number of Tx beams. For example, if the number of beams within the Tx beam set is $N_{tx}$ or less, constraints of a transmission power according to beam direction change which are suggested in the present invention may not be applied, and the constraints may be applied only if the number of beams within the Tx beam set exceeds $N_{tx}$. $N_{tx}$ may be configured by the network and signaled to the UE.

Suggestion 2) Grouping of Tx Beams into One or More Beam Groups and Configuration/Setting of Power Ramping Counter Per Beam Group If a plurality of beams exist in the UE, a method for grouping Tx beams of the UE may be considered. One or more Tx beams may be allocated to one beam group, and Tx beams which belong to the same beam group share the power ramping counter. The power ramping counters between different beam groups are managed independently. For example, the UE may have maximum Ng beam groups, each of which has a power ramping counter. Ng power ramping counters for Ng beam groups are initialized to the same value, wherein Ng is included in RACH configuration information and transmitted to the UE. The number Nb of Tx beams per beam group may be selected by the UE. If the beam groups have the same number of Tx beams, the number of Tx beams of the UE is Ng*Nb, and beam groups may have different number of Tx beams depending on panel configuration of the UE.

Preferably, Tx beams included in the same beam group are the beams of which transmission directions are partially overlapped. If Tx beams of the UE are grouped into beams of which Tx beam directions are similar, the UE selects a transmission direction within a specific beam group and performs power ramping for the selected beam and then changes a beam direction within the corresponding beam group. In this case, even though the power ramping counter for previous PRACH (re)transmission is inherited as it is to transmit RACH preamble at a ramping-up power, that is, is operated as shown in FIG. 9(a), serious interference may not be caused in the network due to similarity of Tx beam directions within the same beam group. Beams of which Tx beam directions are not similar are grouped into their respective beam groups different from each other. The beam groups have their respective power ramping counters, and if the UE changes the Tx beam directions by changing the beam groups, the power ramping counter for RACH preamble retransmission is determined based on the number of retransmissions per beam group.

If a lot of Tx beams are provided per beam group and transmission directions between Tx beams within the beam group are different from each other, the method described in the suggestion 1 as a method for reducing network interference may equally be applied to the suggestion 2. That is, the method A or the method B may be applied to each beam group.

As a modification of this suggestion, if the UE does not have a separate power ramping counter per beam group and retransmits RACH preamble by changing Tx beams within the same beam group, the power ramping counter is increased. However, if the UE changes beams to another beam group during RACH preamble retransmission, the power ramping counter may be configured so as not to be changed (that is, transmission power value or PREAMBLE_RECEIVED_TARGET_POWER is not changed).

Suggestion 3) Designation of Limitation in RACH Preamble Retransmission while Power Ramping Counter is not Increased if Retransmission is Performed by Beam Change In this suggestion, the basic operation of the UE, "the UE does not increase the power ramping counter when changing Tx beams" is performed only if an initial certain condition is satisfied. In case of a certain threshold or more, even though the UE transmits RACH preamble by changing beams, the power ramping counter is increased as much as a certain value (e.g., 1). This is to prevent initial access latency from being too increased due to too long delay of the RACH procedure of the UE of which BC is not hold.

It is assumed that "the operation for not increasing the ramping counter when the UE changes Tx beams during RACH preamble (re)transmission" is referred to as operation A, and the operation for always increasing a power ramping counter as much as a certain value (e.g., 1) during RACH preamble retransmission regardless of Tx beam change during RACH preamble (re)transmission is referred to as operation B. A condition for establishing the operation A may have operations as follows.

Option 1) The UE follows the operation A only in case of power ramping counter ≤Npc, and then follows the operation B. In this case, Npc may be signaled or configured by the network in advance. Npc is a value that the power ramping counter may have, and if the power ramping counter is smaller than or equal to Npc, the UE follows the operation A during RACH preamble retransmission, but follows the operation B, that is, increases the power ramping counter regardless of change of Tx beams during RACH preamble retransmission if the power ramping counter is increased and thus greater than Npc.

Option 2) The UE performs the operation A only in case of the number of RACH preamble transmissions ≤Ncounter, and follows the operation B in case of the number of RACH preamble transmissions >Ncounter. Ncounter may be signaled or configured by the network in advance. The UE does not increase the power ramping counter when changing Tx beams while the UE performs RACH preamble transmission Ncounter times. However, if the number of RACH preamble transmissions becomes greater than Ncounter, the UE increases the power ramping counter as much as a certain value (e.g., 1) when changing Tx beams.

Option 3) A value of Nbcounter may be signaled or configured by the network in advance. The UE may transmit RACH preamble as much as maximum Nbcounter times in accordance with the operation A. That is, Nbcounter corresponds to the number of times that a UE maintains the power ramping counter as it is without increase when Tx beams are changed. The UE may follow the operation A as much as maximum Nbcounter times. However, in excess of corresponding times, the UE increases the power ramping counter if Tx beams are changed during later RACH preamble retransmission.

Option 4) The UE follows the operation A only in case of PREAMBLE_RECEIVED_TARGET_POWER ≤Ptarget_power, and follows the operation B if a corresponding condition is not satisfied. That is, if PREAMBLE_RECEIVED_TARGET_POWER calculated by the UE during RACH preamble retransmission is smaller than or equal to Ptarget_power, the UE does not increase the power ramping counter if Tx beams are changed in accordance with the operation A. However, if PREAMBLE_RECEIVED_TARGET_POWER exceeds Ptarget_power, the UE increases the power ramping counter as much as a certain value (e.g., 1) during RACH preamble retransmission regardless of Tx beams in accordance with the operation B. Ptarget_power may be signaled or configured by the network in advance.

Option 5) The UE follows the operation A only in case of $P_{PRACH} \leq P_{level}$, and follows the operation B if the corresponding condition is not satisfied. $P_{level}$ may be signaled or configured by the network in advance. When a transmission power of RACH preamble calculated in L1 is smaller than or equal to $P_{level}$, the UE does not increase the power ramping counter if Tx beams are changed in accordance with the operation A. However, if the calculated transmission power of the RACH preamble exceeds $P_{level}$, the UE increases the power ramping counter as much as a certain value (e.g., 1) during RACH preamble retransmission in accordance with the operation B regardless of Tx beams.

Suggestion 4) Combination of Suggestion 1 and Suggestion 3

Suggestion 4 is a method for managing interference on a neighboring UE/cell while reducing latency of RACH procedure in a multi-beam environment, and corresponds to combination of the suggestion 1 and the suggestion 3. When the UE of which BC is not hold transmits RACH preamble, too high interference may be caused in an inexact direction if the UE first performs power ramping and then performs beam switching. To avoid this, the number of times for continuously transmitting RACH preamble in the same beam direction may be limited. Furthermore, if the UE transmits the RACH preamble prior to beam switching during initial RACH preamble transmission, power ramping may be too slow during RACH preamble transmission of the UE unless the ramping counter is increased unconditionally when Tx beams are changed. Therefore, a method for not performing power ramping during beam switching is limited to be applied under a certain condition, and if the corresponding condition is not satisfied, the power ramping counter is increased regardless of beam switching, whereby latency of the RACH procedure may be prevented from being too increased.

As a modification of the suggestion 4, PRACH power control may be performed by combination of the suggestions 1, 2 and 3. Even though a plurality of beams that the UE has are grouped into one or more beam groups, and RACH preamble is retransmitted while switching the beams within the same beam group, the power ramping counter is increased. However, if beam group is changed, the power ramping counter is maintained. Likewise, to avoid too latency, the operation for maintaining the power ramping counter may be limited to be applied under a certain condition (see suggestion 3). Only when the corresponding condition is maintained, the UE maintains the power ramping counter if the UE transmits RACH preamble by changing from a beam belonging to one beam group to a beam belonging to another beam group. However, when the corresponding condition is not maintained, the UE increases the power ramping counter even though the UE transmits the RACH preamble by changing the beam groups. Details of the corresponding condition are described in the suggestion 3. If the UE has transmitted the RACH preamble as much as a certain number of times (or reaches a certain power level or a certain preamble received target power) by using only beams within the same beam group, the UE should attempt RACH preamble transmission by changing the corresponding beam group to another beam group (see suggestion 1).

Limitation to which Suggested Methods (Suggestion 1~Suggestion 4) can be Applied The basic method (e.g., method for maintaining a power ramping counter without increase if beams are changed during RACH preamble retransmission) and the suggestions of the present invention described to solve the problems derived from the basic method are actually applied to the UE having a capability capable of determining correspondence to Tx/Rx beam direction. In case of the UE having a BC capability, it is preferable to increase the power ramping counter during every RACH preamble retransmission. However, it is required to clarify how the UE may specify a BC capability and clarify a range of beam change. When the UE transmits RACH preamble, basis of occurrence of beam change may be categorized into three cases as follows:

1) case that the UE changes Tx beams during RACH preamble transmission because the UE has no BC capability (for beam switching);

2) case that the UE changes beams for tracking for DL beams (e.g., SS blocks) (for receiving beam tracking); and 3) case that the UE changes receiving beams of gNB by changing DL beams (e.g., SS blocks) (that is, changing RACH resources) (for this reason, Tx beam change of the UE may occur).

Among the three cases listed above, the case 3 of RARCH resource transmission will separately be described below. In this case, two cases of the case 1 and the case 2 will be described. It is required to clarify how the UE should perform RACH preamble power control for the case 1 and the case 2. Tx beam change of the UE occurs in both two cases. However, the case 2 may frequently occur in the UE having BC capability due to position/angle change of the UE.

Before primarily transmitting RACH preamble, the UE should determine the number of beam directions for which PRACH procedure is to be attempted. This is different from that the UE receives a plurality of signals (e.g., SS blocks) transmitted from gNB through DL and determines the number of SS blocks for which the UE would perform a RACH procedure. This relates to how many Tx beam the UE uses when attempting RACH preamble transmission for and which direction the UE should attempt the RACH preamble transmission, when the UE selects one SS block and transmits RACH preamble for the selected SS block. Before the UE transmits RACH preamble, a negotiation as to how many Tx beams should be used by the UE to transmit RACH preamble should be made between a higher layer (at least layer 2) and a layer 1 (that is, physical layer) of the UE. In case of a UE having a BC capability, one Tx beam direction may be sufficient. In this case, a higher layer of the corresponding UE notifies the layer 1 that the number of Tx beam sets is 1. In case of a UE having no BC capability, a plurality of Tx beam directions should be given, and the higher layer of the UE notifies the layer 1 of the number of Tx beams, that is, the number of Tx beam directions. The number of Tx beams, which may be used by the UE having no BC capability for RACH preamble transmission for each SS block, may be 2 to dozens. The layer 2 (e.g., L2) provides the number of Tx beams and beam direction information (e.g., weight vector, spatial parameters, etc.), which will be attempted by the UE for RACH preamble transmission in the selected RACH resource, to the L1.

Basically, if UE Tx beam change occurs in the case 2 due to a purpose for reception tracking despite that the UE has a BC capability, it is not preferable to apply a power control method for maintaining the power ramping counter during beam change. In this case, the UE should increase the power ramping counter when performing retransmission by changing beams.

If the higher layer indicates that the number of Tx beams within the Tx beam set is 1, the UE determines that the UE has a BC capability and increases the power ramping counter every RACH preamble retransmission. Even though beam change occurs in the case 2, the UE increases the power ramping counter during retransmission. If the higher layer (e.g., L2) notifies the lower layer (e.g., L1) that a plurality of beams are provided in a set of Tx beams, the UE determines that it has no BC capability and does not increase the power ramping counter when changing beams during PRACH retransmission as described in the present invention. The methods suggested in the present invention may be applied to the problems that may occur due to the above operation. As another method, the network may determine whether to apply these constraints in accordance with the number of Tx beams. For example, the constraints of the transmission power according to beam direction change which are suggested in the present invention are not applied if the number of beams within the Tx beam set is $N_{tx}$ or less, whereas the constraints may be applied only if the number of beams within the Tx beam set exceeds $N_{tx}$. $N_{tx}$ is set by the network and signaled to the UE. Alternatively, $N_{tx}$ beams may allow the UE to assume beams of which mutual BCs are hold. $N_{tx}$ may be configured for the UE by the network, or may be designated in the standard document.

RACH Resource Change

There may be another domain (e.g., RACH resource) for RACH preamble retransmission in a multi-beam environment. That is, the UE may switch RACH resources for RACH preamble retransmission. Although RACH resource selection depends on the UE, some restrictions should be required for switching of RACH resources to reduce a ping-pong effect between the RACH resources. In other words, RACH resource switching for the RACH procedure should depend on a UE having specific criteria. For example, the UE may switch the RACH resources if the best received beam (e.g., SS block index) is changed or multiple beams (e.g., SS blocks) are received in a similar received quality.

Hereinafter, the RACH resource selection method will be described in more detail. In this case, the RACH resources refer to time/frequency resources for transmitting RACH preamble, and may additionally include a preamble sequence set (or preamble code set). That is, in a multi-beam environment, if the UE selects a specific RACH resource for RACH preamble transmission and transmits the RACH preamble on the specific RACH resource, the specific RACH resource serves to inform the network of a DL beam direction preferred by the UE. For example, in a system where a plurality of SS blocks are transmitted on a cell and are subjected to beamforming in different DL beam directions, if the UE intends to attempt RACH for a SS block received with the best quality, the UE selects a RACH resource associated with the SS block and transmits a RACH preamble on the RACH resource. The associated relation between the SS block and the RACH resource may be configured with an associated relation between a specific SS block and a time/frequency resource, or with an associated relation between the SS block and time/frequency/code resource. Additionally, if a plurality of CSI-RS are configured in the system and an associated relation with RACH resource per CSI-RS is configured, and if the UE is configured to transmit RACH in a CSI-RS transmission direction, the associated relation between CSI-RS and time/frequency/ code resource may be configured. In the present invention, although it is assumed that the RACH resource is associated with SS block, the present invention is not only applied to the case that the RACH resource is associated with the SS block but also applied to the case that the RACH resource is associated with another DL signal representative of DL Tx beam direction. For example, in the present invention, the SS block is a signal/channel representative of DL Tx beam direction, and may be replaced with another signal/channel (e.g., CSI-RS) representative of DL Tx beam direction.

PRACH transmission power is determined by the Equation (1) or its modification, and an open loop power control method for UL transmission is used for control of a PRACH transmission power. At this time, PL of the Equation (1) is a downlink path loss and may be represented by a downlink signal (e.g., SS block) received power value (e.g., reference signal received power (RSRP) (hereinafter, SS block RSRP) based on SS block). Also, a preamble received target power PREAMBLE_RECEIVED_TARGET_POWER of the Equation (1) is a received power value predicted/expected by the UE when a specific signal is received in the gNB, and is a UL transmission power value estimated by the UE. This preamble received target power may be different from a received power value which actually reaches the gNB. The preamble received target power is determined by the initial set value configured by the gNB and a transmission power increased as much as a certain level whenever the UE fails in RACH preamble transmission. The UE selects a SS block based on RSRP per SS block or reference signal. If a plurality of SS blocks are transmitted on a cell, the UE measures RSRP by assuming that the same transmission power is applied to each SS block. That is, it is assumed that the same transmission power is applied to each SS block unless there is a separate signaling. If the transmission power is different per SS block, the gNB needs to signal this. For example, a reference SS block may be designated, and the gNB may signal a difference in a transmission power per SS block compared with a transmission power of the reference SS block. In this case, the reference for selecting SS block, that is, RACH resource in the UE should not be a simple RSRP, but a value considering a transmission power ratio of a corresponding SS block in a measured RSRP.

After the UE transmits the RACH preamble, the UE monitors a DL control channel (e.g., control resource set (CORSET)) for receiving RAR for a given time (e.g., RAR window). If RAR is not received successfully for a corresponding time, the UE attempts RACH preamble retransmission. When SS block of the best quality is changed while the UE attempts the RACH preamble retransmission, the UE should determine whether to use the previous RACH resource used by the UE as it is or select a new RACH resource for the RACH preamble retransmission. Whether to maintain the RACH resource or select new RACH resource, that is, whether to maintain or change a target SS block is determined depending on when the UE measures SS block RSRP. A selected RACH resource (that is, selected SS block) is varied depending on whether to select the RACH resource every RACH preamble initial transmission timing or select the RACH resource every RACH preamble (re) transmission timing.

1) RACH Resource Selection Opportunity: During RACH Preamble Initial Transmission In this method, the UE selects the RACH resource during RACH preamble initial transmission. In this method, the UE newly selects the RACH resource or stops the current RACH procedure to start the new RACH procedure only if a specific condition configured by the gNB (or previously defined) is satisfied. That is, the UE measures SS block RSRP during or just before RACH preamble initial transmission and transmits a RACH preamble by selecting the RACH resource based on the SS block RSRP. For convenience of description, a SS block received with the best quality during or just before RACH initial transmission or a SS block selected by the UE is referred to as a target SS. The UE selects a target SS block and transmits a RACH preamble (that is, Msg1) by using the RACH resource associated with the target SS Block. In this method, the UE may change the RACH resource during RACH preamble retransmission only if a certain condition configured by the gNB or previously defined is satisfied. Conditions that may change the RACH resource are as follows.

a) At any time when RACH preamble retransmission is to be performed, when another SS block having received RSRP better than the target SS block RSRP at a certain level (e.g., X dB) or more for a certain time (e.g., T msec) or more is discovered, the UE changes the SS block to the target SS block and performs RACH preamble retransmission in the changed RACH resource. In this case, T and X may be defined in advance, or may be configured for the UE by the gNB.

b) If the transmission power of the UE reaches a maximum allowed transmission power due to RACH preamble retransmission of several times in the RACH resource associated with the target SS block, or after transmitting the RACH preamble of M times at the maximum allowed transmission power, the UE changes the RACH resource by changing the target SS block. In this case, received signal quality of the new target SS block may be lower than the existing target SS block RSRP. In this case, M and the maximum allowed transmission power value may be defined in advance, or may be configured for the UE by the gNB.

In this method, if the above conditions are satisfied, the UE ends the RACH procedure using the RACH resource associated with the existing target SS block. If RACH preamble transmission starts in the RACH resource associated with the new target SS block, this may be understood that the new RACH procedure starts. Therefore, RACH configuration/parameters used for the RACH procedure should be initialized. If the RACH procedure ends, the physical layer of the UE delivers RACH procedure failure or termination message to the higher layer (e.g., L2). If the UE changes the target SS block, the UE updates the estimated PL value of the Equation (1) to newly selected target SS block RSRP.

If the UE intends to partially inherit RACH related parameters used for the existing RACH procedure in starting the new RACH procedure, it may be understood that the existing RACH procedure does not end and the following method is performed.

2) RACH Resource Selection Opportunity: Every RACH Preamble Transmission Timing

In this method, the UE selects the RACH resource during every RACH preamble (re)transmission. For example, the UE selects a target SS block by measuring SS block during initial transmission and transmits a RACH preamble by selecting a RACH resource associated with the target SS block, and selects a new target SS block when intending to retransmit the RACH preamble due to failure in RAR reception and transmits a RACH preamble on the RACH resource associated with the newly selected target SS block. In this method, the target SS block may be different per every RACH preamble retransmission timing. Therefore, RACH preamble retransmission may be performed in a RACH resource different from the RACH resource of previous transmission. That is, in this method, there is no specific restriction in changing the RACH resources, and the UE may freely attempt RACH preamble transmission for SS Blocks having the same cell ID. In this method, the UE is not responsible for performing/constrained to perform measurement for SS block during every RACH preamble (re)

transmission, but may freely change the RACH resource in accordance with quality of a received signal by performing measurement for the SS block. If the UE changes the target SS block, the UE updates the estimated PL value of the Equation (1) to newly selected target SS block RSRP.

When the target SS block is changed, if the power ramping counter is initialized, a problem occurs in that latency of the RACH procedure may be increased. Therefore, in the present invention, if a UE performs RACH preamble retransmission while changing the RACH resource, the power ramping counter for determining a received target power is inherited. Inheritance of the power ramping counter may be interpreted as follows: the power ramping counter may be maintained equally to the previous value if the RACH resource is changed (that is, if the target SS block is changed). If a UE performs RACH preamble retransmission while changing the RACH resource, the number of RACH preamble transmissions at the UE are integrally calculated regardless of change of the target SS block.

As the UE may select a RACH resource within a full set of the RACH resources associated with each SS block at a desired time, RACH preamble retransmission(s) within the resource set of the corresponding RACH resources is(are) considered as one RACH procedure. The UE may select a SS block measured with received quality of a certain level or more or a level similar to that of the existing target SS block RSRP when selecting a RACH resource. Criteria for the RACH resource selection are similar to the conditions 'a' and 'b' described in the method "1) RACH resource selection opportunity".

However, maintaining or increasing the RACH preamble power ramping counter of the UE when retransmitting the RACH preamble by changing the RACH resource may be unfavorable for the network. That is, although the UE has retransmitted the RACH preamble while continuously increasing or maintaining the power ramping counter, if RSRP value of the SS block, which is measured at a specific time, is very good, for example, if the UE is very close to the center of a cell or a received signal value of a specific DL beam direction of the UE is better than a certain value, when the UE transmits the RACH preamble by using the increased power ramping counter, excessive interference may be caused on a neighboring UE or target/neighboring cell. Particularly, in an unlicensed band, maintaining or increasing the RACH preamble power ramping counter of the UE whenever retransmitting the RACH preamble by changing the RACH resource may too constrain RACH of another UE. Therefore, if the UE changes the RACH resource, it should be allowed that the RACH preamble power ramping counter value of the UE is initialized or reset to a specific value. The power ramping counter value may be initialized if one or both of the following conditions are satisfied:

1) the case that RSRP value of SS block associated with the newly selected RACH resource reaches a certain dB or more; and 2) the case that RSRP value of SS block associated with the newly selected RACH resource is better than RSRP of SS block associated with the RACH resource used for previous RACH preamble transmission, as much as a certain dB (offset) or more.

Figure 10:
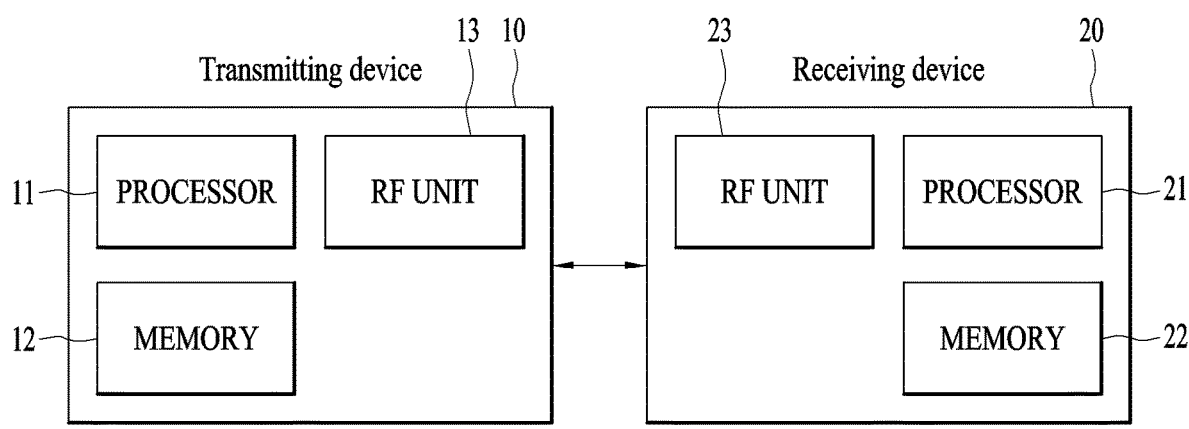
FIG. 10 is a block diagram illustrating elements of a transmitting device 10 and a receiving device 20 for implementing the present invention.

FIG. 10 is a block diagram illustrating elements of a transmitting device 10 and a receiving device 20 for implementing the present invention.

The transmitting device 10 and the receiving device 20 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described embodiments of the present invention.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmitting device and the receiving device. Especially, the processors 11 and 21 may perform various control functions to implement the present invention. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include $N_t$ (where $N_t$ is a positive integer) transmit antennas.

A signal processing process of the receiving device 20 is the reverse of the signal processing process of the transmitting device 10. Under control of the processor 21, the RF unit 23 of the receiving device 20 receives radio signals transmitted by the transmitting device 10.

The RF unit 23 may include $N_r$ (where $N_r$ is a positive integer) receive antennas and frequency down-converts each signal received through receive antennas into a baseband signal. The processor 21 decodes and demodulates the radio signals received through the receive antennas and restores data that the transmitting device 10 intended to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. The signal transmitted from each antenna cannot be further deconstructed by the receiving device 20. An RS transmitted through a corresponding antenna defines an antenna from the view point of the receiving device 20 and enables the receiving device 20 to derive channel estimation for the antenna, irrespective of whether the channel represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. An RF unit supporting a MIMO function of transmitting and receiving data using a plurality of antennas may be connected to two or more antennas.

In the present invention, the RF units 13 and 23 may support Rx BF and Tx BF. For example, in the present invention, the RF units 13 and 23 may be configured to perform the function illustrated in FIG. 2.

In the embodiments of the present invention, a UE operates as the transmitting device 10 in UL and as the receiving device 20 in DL. In the embodiments of the present invention, a gNB operates as the receiving device 20 in UL and as the transmitting device 10 in DL. Hereinafter, a processor, an RF unit, and a memory included in the UE will be referred to as a UE processor, a UE RF unit, and a UE memory, respectively, and a processor, an RF unit, and a memory included in the gNB will be referred to as a gNB processor, a gNB RF unit, and a gNB memory, respectively.

Figure 11:
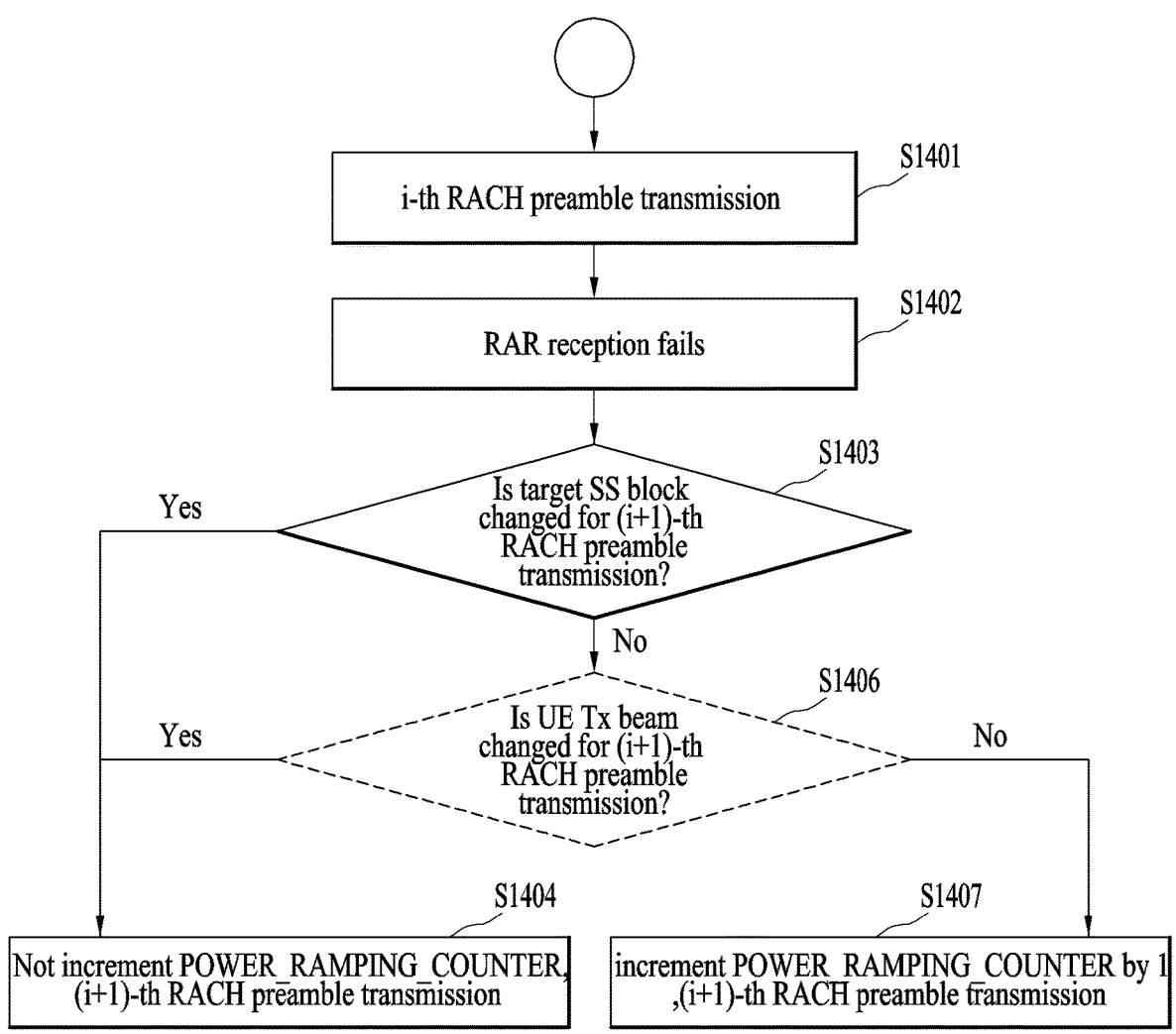
FIG. 11 illustrates an example of a method for determining a PRACH transmission power.

FIG. 11 illustrates an example of a method for determining a PRACH transmission power.

Referring to FIGS. 10 and 11, the UE processor controls the UE RF unit to perform i-th RACH preamble transmission for a target SS block (S1401). The i-th RACH preamble transmission may be initial transmission or retransmission. If the i-th RACH preamble transmission is retransmission, the UE processor increases a preamble transmission counter as much as 1 for the i-th RACH preamble transmission. The UE processor may select a target SS block in accordance with the aforementioned present invention. The UE processor may determine Tx beams which will be used for RACH preamble transmission and control the UE RF unit to perform the i-th RACH preamble transmission by using the Tx beams in accordance with the aforementioned present invention. The UE processor may control the UE RF unit to perform RACH preamble transmission by using the RACH resource associated with the target SS block. If RAR for the i-th RACH preamble transmission is not received successfully (S1403), the UE processor may control the RF unit to perform (i+1)-th RACH preamble transmission (S1404 or S1407). A preamble transmission counter value of the (i+1)-th RACH preamble transmission is increased as much as 1 compared with a preamble transmission counter value of the i-th RACH preamble transmission. The UE processor may maintain a target SS block of the (i+1)-th RACH preamble transmission equally to that of the i-th RACH preamble transmission or change the target SS block of the (i+1)-th RACH preamble transmission differently from that of the i-th RACH preamble transmission. If the target SS block of the (i+1)-th RACH preamble transmission is changed (S1403, Yes), the UE processor does not increase a power ramping counter and maintains the power ramping counter equally to a power ramping counter value of the i-th RACH preamble transmission. The UE processor maintains the power ramping counter equally to the power ramping counter value of the i-th RACH preamble transmission even though the (i+1)-th RACH preamble transmission is performed using a Tx beam having the same index as that of the i-th RACH preamble transmission.

If the target SS block of the (i+1)-th RACH preamble transmission is not changed (S1403, No), in accordance with whether or not the UE changes Tx beam for use (for example, in accordance with whether or not the UE changes Tx beam index which is used), the UE processor either maintains the power ramping counter of the (i+1)-th RACH preamble equally to a power ramping counter value of the i-th RACH preamble transmission (S1404), or increases the power ramping counter of the (i+1)-th RACH preamble as much as 1 compared with the power ramping counter value of the i-th RACH preamble transmission (S1407).

The UE processor controls the UE RF unit to perform RACH preamble transmission as far as the preamble transmission counter value does not exceed a value of maximum transmission times. For example, if the preamble transmission counter value of the (i+1)-th RACH preamble transmission exceeds the maximum number of transmissions, the UE processor may determine that the RACH procedure has been failed, and may start a new RACH procedure after a certain time.

As described above, the detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The embodiments of the present invention are applicable to a BS, a UE, or other devices in a wireless communication system.

The invention claimed is:

1. A method for transmitting, by a user equipment (UE), a random access preamble in a wireless communication system, the method comprising:
    performing a first random access preamble transmission for a first synchronization signal (SS) block at a first transmission power; and
    performing a second random access preamble transmission for a second SS block at a second transmission power based on not successfully receiving a random access response to the first random access preamble transmission,
    wherein the second transmission power is determined based on a power ramping counter value used for determination of the first transmission power based on the second SS block being different from the first SS block.

2. The method according to claim 1,
    wherein, based on the second SS block being the same as the first SS block, the second transmission power is determined:
    based on a power ramping counter value incremented by 1 from the power ramping counter value used for determination of the first transmission power when a transmission (Tx) beam used for the second random access preamble transmission is the same as a Tx beam used for the first random access preamble transmission, and based on the same power ramping counter value as that used for determination of the first transmission power when the Tx beam used for the second random access preamble transmission is different from the Tx beam used for the first random access preamble transmission.

3. The method according to claim 1,
wherein the first random access preamble transmission is performed on a first random access channel (RACH) resource associated with the first SS block, and
wherein the second random access preamble transmission is performed on a second RACH resource associated with the second SS block.

4. The method according to claim 3,
wherein the first RACH resource is different from the second RACH resource based on the first SS block being different from the second SS block.

5. The method according to claim 1, further comprising:
incrementing a preamble transmission counter by 1 to set the preamble transmission counter to a first value for the first random access preamble transmission; and
setting the preamble transmission counter to a second value by adding 1 to the first value for the second random access preamble transmission.

6. The method according to claim 5,
wherein the second random access preamble transmission is performed only in a state in which the second value does not exceed a maximum number of preamble transmissions.

7. A user equipment (UE) configured to transmit a random access preamble in a wireless communication system, the UE comprising:
a radio frequency (RF) transceiver;
a processor; and
a memory that is connectable to the processor and that stores thereon at least one computer program which, when executed, causes the processor to perform operations comprising:
performing a first random access preamble transmission for a first synchronization signal (SS) block at a first transmission power; and
performing a second random access preamble transmission for a second SS block at a second transmission power based on not successfully receiving a random access response to the first random access preamble transmission,
wherein the operations further comprise: determining the second transmission power based on a power ramping counter value used for determination of the first transmission power based on the second SS block being different from the first SS block.

8. The UE according to claim 7,
wherein, based on the second SS block being the same as the first SS block, determining the second transmission power comprises:
determining the second transmission power based on a power ramping counter value incremented by 1 from the power ramping counter value used for determination of the first transmission power when a transmission (Tx) beam used for the second random access preamble transmission is the same as a Tx beam used for the first random access preamble transmission, and
determining the second transmission power based on the same power ramping counter value as that used for determination of the first transmission power when the Tx beam used for the second random access preamble transmission is different from the Tx beam used for the first random access preamble transmission.

9. The UE according to claim 7,
wherein the first random access preamble transmission is performed on a first random access channel (RACH) resource associated with the first SS block, and the second random access preamble transmission is performed on a second RACH resource associated with the second SS block.

10. The UE according to claim 9,
wherein the first RACH resource is different from the second RACH resource based on the first SS block being different from the second SS block.

11. The UE according to claim 7, wherein the operations further comprise:
incrementing a preamble transmission counter by 1 to set the preamble transmission counter to a first value for the first random access preamble transmission, and setting the preamble transmission counter to a second value by adding 1 to the first value for the second random access preamble transmission.

12. The UE according to claim 11,
wherein the second random access preamble transmission is performed only in a state in which the second value does not exceed a maximum number of preamble transmissions.

13. A processing apparatus configured to control a user equipment (UE) to transmit a random access preamble in a wireless communication system, the processing apparatus comprising:
a processor; and
a memory that is connectable to the processor and that stores thereon at least one computer program which, when executed, causes the processor to perform operations comprising:
performing a first random access preamble transmission for a first synchronization signal (SS) block at a first transmission power; and
performing a second random access preamble transmission for a second SS block at a second transmission power based on not successfully receiving a random access response to the first random access preamble transmission,
wherein the operations further comprise: determining the second transmission power based on a power ramping counter value used for determination of the first transmission power based on the second SS block being different from the first SS block.

14. The processing apparatus according to claim 13,
wherein, based on the second SS block being the same as the first SS block, determining the second transmission power comprises:
determining the second transmission power based on a power ramping counter value incremented by 1 from the power ramping counter value used for determination of the first transmission power when a transmission (Tx) beam used for the second random access preamble transmission is the same as a Tx beam used for the first random access preamble transmission, and
determining the second transmission power based on the same power ramping counter value as that used for determination of the first transmission power when the Tx beam used for the second random access preamble transmission is different from the Tx beam used for the first random access preamble transmission.

15. The processing apparatus according to claim 13,
wherein the first random access preamble transmission is performed on a first random access channel (RACH) resource associated with the first SS block, and the second random access preamble transmission is performed on a second RACH resource associated with the second SS block.

16. The processing apparatus according to claim 15,
wherein the first RACH resource is different from the second RACH resource based on the first SS block being different from the second SS block.

17. The processing apparatus according to claim 13, wherein the operations further comprise:
incrementing a preamble transmission counter by 1 to set the preamble transmission counter to a first value for the first random access preamble transmission, and setting the preamble transmission counter to a second value by adding 1 to the first value for the second random access preamble transmission.

18. The processing apparatus according to claim 17,
wherein the second random access preamble transmission is performed only in a state in which the second value does not exceed a maximum number of preamble transmissions.

\* \* \* \* \*